US011374374B2

(12) United States Patent
Graber-Tilton et al.

(10) Patent No.: US 11,374,374 B2
(45) Date of Patent: Jun. 28, 2022

(54) METHOD AND SYSTEM FOR ALIGNMENT AND INSERTION OF WIRE CONTACT WITH WIRE CONTACT INSERTION HOLES OF A CONNECTOR

(71) Applicant: The Boeing Company, Chicago, IL (US)

(72) Inventors: Alexander Graber-Tilton, Wall, NJ (US); Richard J. Patrick, Irvine, CA (US); Heiko Hoffmann, Malibu, CA (US)

(73) Assignee: THE BOEING COMPANY, Chicago, IL (US)

( * ) Notice: Subject to any disclaimer, the term of this patent is extended or adjusted under 35 U.S.C. 154(b) by 319 days.

(21) Appl. No.: 16/536,598

(22) Filed: Aug. 9, 2019

(65) Prior Publication Data
US 2021/0044070 A1 Feb. 11, 2021

(51) Int. Cl.
*B23P 19/00* (2006.01)
*H01R 43/28* (2006.01)
(Continued)

(52) U.S. Cl.
CPC ............ *H01R 43/28* (2013.01); *H01R 13/41* (2013.01); *H01R 13/5208* (2013.01); *Y10T 29/53213* (2015.01)

(58) Field of Classification Search
CPC ........... B25J 15/00; G05B 2219/40607; Y10T 74/20305; Y10T 29/49764;
(Continued)

(56) References Cited

U.S. PATENT DOCUMENTS 4,567,610 A   1/1986   McConnell
6,711,293 B1  3/2004   Lowe
(Continued)

FOREIGN PATENT DOCUMENTS

EP   0182951 A2   5/1986
EP   2783802 A2   10/2014
(Continued)

OTHER PUBLICATIONS

Final Office Action for U.S. Appl. No. 16/536,622 dated Oct. 2, 2020.
(Continued)

*Primary Examiner* — Thiem D Phan
(74) *Attorney, Agent, or Firm* — Alston & Bird LLP

(57) ABSTRACT

A method, system and computer program product are provided for aligning and inserting a wire contact within a target hole of a connector to facilitate the automated insertion of the wire ends of a wire bundle assembly into the wire contact insertion holes of a connector. Methods may include: obtaining captured images, from at least two image capture devices attached to an end-effector of a robot, of a wire gripper of the end-effector; causing the robot to advance the end-effector to move the wire contact within a predetermined distance of the connector; causing the robot to advance the end-effector to move the wire contact toward the connector a predetermined additional amount more; and identifying, based on movement of the wire contact the predetermined additional amount more, if alignment is correct from force feedback at the wire gripper.

20 Claims, 14 Drawing Sheets

(51) Int. Cl.
  H01R 13/41    (2006.01)
  H01R 13/52    (2006.01)
(58) Field of Classification Search
  CPC ......... Y10T 29/49822; Y10T 29/49162; Y10T 29/53213
  USPC ................. 29/748, 593, 747, 787, 837, 842
  See application file for complete search history.

(56) References Cited

U.S. PATENT DOCUMENTS

| | | | |
|---|---|---|---|
| 8,494,304 | B2 | 7/2013 | Venable et al. |
| 8,670,619 | B2 | 3/2014 | Funayama et al. |
| 10,288,410 | B2 | 5/2019 | Hoffmann |
| 2005/0254699 | A1 | 11/2005 | Sano et al. |
| 2007/0019868 | A1 | 1/2007 | Takai et al. |
| 2015/0120047 | A1 | 4/2015 | Motoyoshi et al. |
| 2017/0151673 | A1 | 6/2017 | Kobayashi et al. |
| 2017/0160077 | A1 | 6/2017 | Featherstone et al. |
| 2017/0243357 | A1 | 8/2017 | Peng et al. |
| 2018/0108458 | A1 | 4/2018 | Maki et al. |
| 2018/0130218 | A1 | 5/2018 | Hoffman |
| 2020/0306993 | A1* | 10/2020 | Smith .................... B25J 15/024 |
| 2021/0016438 | A1* | 1/2021 | Pivac ..................... B25J 13/08 |

FOREIGN PATENT DOCUMENTS

| | | | |
|---|---|---|---|
| JP | H05-62757 A | 3/1993 |
| JP | 2004-119046 A | 4/2004 |
| JP | 2016-058320 A | 4/2016 |
| WO | WO 2015/156793 A1 | 10/2015 |

OTHER PUBLICATIONS

Borgefors, Gunilla, "Distance transformations in digital images," Comput. Vision Graph. Image Process., 34(3): 344-371, (1986).
Canny, John, "A Computational Approach to Edge Detection," IEEE Trans. Pattern Analysis and Machine Intelligence, 8(6):679-698, (1986).
Choe et al., "Vision-based estimation of bolt-hole location using circular hough transform," ICCAS-SICE 2009—ICROS-SICE International Joint Conference 2009, Proceedings, art. No, 5334375, pp. 4821-4826, (2009).
Davies, E.R. et al., "An Analysis of Hole Detection Schemes," Proc. British Machine Vision Assoc. Conf., Oxford (Sep. 24-27), pp. 285-290, (1990).
Duda, R.O. et al., "Use of Hough transformation to detect lines and curves in pictures," Comm. ACM, 15(1): 11-15, (1972).
"Eroding and Dialating," OpenCV Tutorials, (2019). [<URL: https://docs.opencv.org/2.4/doc/tutorials/imgproc/erosion_dilatation/erosion_dilatation.html>].
"Feature Matching + Homography to find Objects," OpenCV-Python Tutorials, (2013). [<URL: https://opencv-python-tutroals.readthedocs.io/en/latest/py_tutorials/py_feature_homography.html#feature-homography>].
Fitzgibbon, Andrew W. et al., "A Buyer's Guide to Conic Fitting," Proc. 5th British Machine Vision Conference, Birmingham, pp. 513-522, (1995).
Girshick, Ross, "Fast R-CNN" (PDF), In proceedings of the 2015 IEEE International Conference on Computer Vision (ICCV) (ICCV '15), (IEEE Computer Society, Washington, DC, USA), 1440-1448, (2015).
Girshick, Ross, et al., "Rich Feature Hierarchies for Accurate Object Detection and Semantic Segmentation," In Proceedings of the 2014 IEEE Conference on Computer Vision and Pattern Recognition (CVPR '14). (IEEE Computer Society, Washington, DC, USA), 580-587, (2014).
Hu, "Visual Pattern Recognition by Moment Invariants," IRE Transactions on Information Theory, 8(2):179-187, (1962).
Komax Zeta Wire Bundle Assembly Machine, Zeta 640/650 Harness Manufacturing, Komax Group, 12 pages.
Laursen, J.S. et al., "Automatic error recovery in robot assembly operations using reverse execution," 2015 IEEE/RSJ International Conference on Intelligent Robots and Systems (IROS), Hamburg, pp. 1785-1792, (2015).
Liao, S. et al., "Learning Multi-Scale Block Local Binary Patterns for Face Recognition," International Conference on Biometrics (ICB), pp. 828-837, (2007).
Lienhart, R. et al., "An Extended Set of Haar-like Features for Rapid Object Detection," IEEE ICIP, pp. I-900-I-903, (2002).
Lindeberg, T., "Detecting Salient Blob-Like Image Structures and Their Scales with a Scale-Space Primal Sketch: A Method for Focus-of-Attention," International Journal of Computer Vision, 11(3):283-318, (1993).
Liu, W. et al., "SSD: Single shot multibox detector," In European conference on computer vision. 21-37, (2016).
Loborg, P., "Error Recovery in Automation—An Overview," AAAI Technical Report SS-94-04, pp. 94-100, (1994).
Lowe, D., "Distinctive Image Features from Scale-Invariant Keypoints," Int. J. Computer Vision, 60(2):91-110, (2004).
Meyer, F., "Color Image Segmentation," In IEEE Fourth International Conference on Image Processing and its Applications, pp. 303-306, (1992).
Office Action for U.S. Appl. No. 16/536,622 dated Jun. 29, 2020, 9 pages.
Penale-Sanchez, A. et al., "Exhaustive Linearlization for Robust Camera Pose and Focal Length Estimation," In IEEE Trans. on Pattern Analysis and Machine Intelligence, pp. 1-14, (2013).
Press, W. H., et al., "Minimization or Maximization of Functions [excerpt]," Numerical Recipes in C: The Art of Scientific Computing, Cambridge University Press, UK, pp. 412-420, (1993).
Redmon, J. et al., "You Only Look Once: Unified, Real-Time Object Detection," 2016 IEEE Conference on Computer Vision and Pattern Recognition (CVPR), Las Vegas, NV, pp. 779-788, (2016).
Shi and Tomasi, "Good Features to Track," Proceedings of the IEEE Conference on Computer Vision and Pattern Recognition, pp. 593-600, (Jun. 1994).
Sklansky, Jack, "Finding the Convex Hull of a Simple Polygon," Pattern Recognition Letters, 1(2): 79-83, (1982).
Song, H. et al., "USB assembly strategy based on visual servoing and impedance control," 2015 12th International Conference on Ubiquitous Robots and Ambient Intelligence (URAI), Goyang, pp. 114-117, (2015).
Suárez-Ruiz et al., "A Framework for Fine Robotic Assembly," arXiv, (2015). [<URL:https://arxiv.org/abs/1509.04806>].
Suzuki, S. et al., "Topological Structural Analysis of Digitized Binary Images by Border Following," CVGIP, 30(1):32-46, (1985).
Tipping, M.E. et al., "Mixtures of probabilistic principal component analyzers," Neural Computation, 11:443-482, (1999).
Viola, P., et al. "Rapid Object Detection using a Boosted Cascade of Simple Features," Computer Vision and Pattern Recognition (CVPR), pp. 511-518, (2001).
Viola, P., et al., "Robust real-time face detection," International Journal of Computer Vision, 57(2): 137-154, (2004).
U.S. Appl. No. 16/536,622, filed Aug. 9, 2019.
U.S. Appl. No. 16/906,536, filed Jun. 19, 2020.
U.S. Appl. No. 16/906,622, filed Jun. 19, 2020.
Yuen, H.K. et al., "A Comparative Study of Hough Transform Methods for Circle Finding," Image Vision Comput, 8(1):71-77, (1990).
European Application No. 20186225.7, Extended European Search Report dated Jan. 13, 2021.
European Application No. 20186226.5, Extended European Search Report dated Jan. 14, 2021.

* cited by examiner

METHOD AND SYSTEM FOR ALIGNMENT AND INSERTION OF WIRE CONTACT WITH WIRE CONTACT INSERTION HOLES OF A CONNECTOR

TECHNICAL FIELD

A method, system and computer program product are provided in accordance with an example embodiment in order to align wire contacts with insertion holes of a connector, and more particularly, to using a machine-vision system to automatically align wire contacts with wire contact insertion holes of a connector and to insert the wire contacts into respective holes of the connector.

BACKGROUND

Wire bundles consisting of a plurality of wires are utilized in a variety of industries to carry a myriad of different types of signals. The wire of a wire bundle assembly must frequently be terminated with a wire contact and the resulting wire end is inserted into a wire contact insertion hole of a connector, such as in a rubber grommet of a connector. As each wire of a wire bundle is unique and may carry a different type of signal, the wire ends of a wire bundle assembly must be inserted into specific wire contact insertion holes of a connector in order to make the proper connections.

The wire ends of a wire bundle assembly may be manually inserted into the respective wire contact insertion holes defined by a connector. As wire bundle assemblies commonly include hundreds of wires, this manual connection process may be relatively time consuming and error prone and, as a result, may increase the cost of the overall assembly including the wire bundle assembly. As such, automated techniques to insert the wire ends of a wire bundle assembly into the wire contact insertion holes of a connector have been developed in an effort to reduce the time expended to make the connections and to correspondingly reduce the cost of the resulting assembly. However, wire bundle assembly machines generally require the connectors to be in a very restricted and controlled set of locations in order to increase the likelihood that the wire ends of the wire bundle assembly may be properly inserted into the wire contact insertion holes of the connector. As such, wire bundle assembly machines limit the flexibility with which connectors may be presented and, as such, are not suitable for all scenarios.

BRIEF SUMMARY

A method, system and computer program product are provided for aligning wire contacts with insertion holes defined by a connector so as to facilitate the automated insertion of the wire ends of a wire bundle assembly into the wire contact insertion holes of a connector. By facilitating the automated insertion of the wire ends of a wire bundle assembly into the wire contact insertion holes of a connector, the time required to establish such connections and correspondingly the cost associated with the resulting assembly may be reduced while reducing the error rate associated with the connections. The method, system and computer program product of an example embodiment provide substantial flexibility in relation to the manner in which the connector may be located, while still permitting the wire ends of a wire bundle assembly to be securely inserted into and electrically connected to the appropriate wire contact insertion holes of the connector.

In an example embodiment, a system is provided to align wire contacts with insertion holes of a connector and to insert the wire connectors into respective holes of the connector. The system may include a robot having an end-effector, where the end-effector includes a wire gripper and at least two image capture devices secured to the end-effector; and a computing device. The computing device may be configured to: process images captured by the image capture devices to establish a corrective transformation to align the wire contact with the target hole of the connector in a connector surface; cause the robot to translate the end-effector to move the wire gripper along the corrective transformation; cause the robot to advance the end-effector until contact is made with the connector surface; identify, based on force measurements, if the wire contact is inside the target hole of the connector; cause the robot to advance the end-effector to move the wire contact toward the connector a predetermined additional amount more; and identify, based on movement of the wire contact the predetermined additional amount more, if alignment is correct from force feedback at the wire gripper.

According to some embodiments, the computing device configured to identify, based on force measurements, if the wire contact is inside the target hole of the connector, is configured to: identify that the wire contact is not aligned with the target hole of the connector in response to a force observed at the wire gripper above a predefined value; and identify that the wire contact is aligned with the target hole of the connector in response to the force observed at the wire gripper being below the predefined value. The computing device configured to process images captured by the image capture devices to establish corrective transformation to align the wire contact with the target hole of the connector may be configured to: identify, within the processed images, a tip of the wire contact and a direction along which the wire contact extends; and establish a corrective transformation to align the tip of the wire contact and the direction along which the wire contact extends with the target hole in an axis of a three-dimensional coordinate system of the robot end-effector from the processed images.

The computing device of some embodiments may be configured to: determine a maximum distance the wire gripper can advance toward the connector; cause the robot to advance the end-effector to move the wire gripper toward the connector; as the robot is caused to advance the end-effector to move the wire gripper toward the connector, in response to force feedback on the wire gripper satisfying an insertion force value, determine that the wire contact is fully inserted into the connector; and as the robot is caused to advance the end-effector to move the wire gripper toward the connector, in response to force feedback on the wire gripper failing to satisfy the insertion force value before reaching the maximum distance the wire gripper can advance toward the connector, determine that the wire contact is not fully inserted into the connector. In response to the computing device determining that the wire contact is fully inserted into the connector, the computing device is further configured to: cause the robot to retract the end-effector to move the wire gripper away from the connector; and in response to the wire gripper moving a pull distance without force feedback on the wire gripper exceeding a pull test value, identify the wire contact as improperly inserted; in response to force feedback on the wire gripper exceeding a pull test value without the wire gripper having moved a pull distance, identify the wire contact as properly inserted.

According to some embodiments, in response to the computing device determining that the contact is not fully inserted into the connector, the computing device may further be configured to: cause the wire gripper to release a grip on the wire contact; cause the robot to retract the end-effector to move the wire gripper away from the connector; cause the wire gripper to re-grip the wire contact; and cause the robot to advance the end-effector to move the wire gripper and the wire contact toward the connector. According to some example embodiments, force feedback may be established based on a force sensor disposed between the robot and the wire gripper. A tool interfaces with force torque sensor may be employed between the robot and the end effector in such a way that the force torque sensor may be able to accurately detect forces in three orthogonal axes and torques about each of those three axes. Another example embodiment which may be used instead of or in combination with a force torque sensor arrangement is a strain gauge in the gripper, or a strain gauge array. A single strain gauge may not be able to establish the axis along which a force is received but may be used in an example embodiment to detect the force feedback of a wire contact inserted or pulled from a connector. A strain gauge array may be used to identify the axes along which forces are received if desired. The computing device of some embodiments may be configured to: identify, in images captured by the image capture devices, the orientation of a visible portion of the wire contact; and compute a corrective movement in a coordinate frame of the robot end effector using the orientation of the wire contact.

Embodiments provided herein may include a method to align and insert a wire contact into a target hole of a connector. Methods may include: obtaining captured images, from at least two image capture devices attached to an end-effector of a robot, of a wire gripper of the end-effector; processing images captured by the image capture devices to establish a corrective transformation to align the wire contact with the target hole of the connector in a connector surface; causing the robot to translate the end-effector to move the wire gripper along the corrective transformation; causing the robot to advance the end-effector until contact is made with the connector surface; identify, based on force measurements, if the wire contact is inside the target hole of the connector; causing the robot to advance the end-effector to move the wire contact toward the connector a predetermined additional amount more; and identifying, based on movement of the wire contact the predetermined additional amount more, if alignment is correct from force feedback at the wire gripper.

According to some embodiments, identifying, based on force measurements, if the wire contact is inside the target hole of the connector may include: identifying that the wire contact is not aligned with the target hole of the connector in response to a force observed at the wire gripper above a predefined value; and identifying that the wire contact is aligned with the target hole of the connector in response to the force observed at the wire gripper being below the predefined value. Processing images captured by the image capture devices to establish corrective transformation to align the wire contact with the target hole of the connector may include: identifying, within the processed images, a tip of the wire contact and a direction along which the wire contact extends; and establishing a corrective transformation to align the tip of the wire contact and the direction along which the wire contact extends with the target hole in an axis of a three-dimensional coordinate system of the robot end-effector from the processed images.

Methods may include: determining a maximum distance the wire gripper can advance toward the connector; causing the robot to advance the end-effector to move the wire gripper toward the connector; as the robot is caused to advance the end-effector to move the wire gripper toward the connector, in response to force feedback on the wire gripper satisfying an insertion force value, determining that the wire contact is fully inserted into the connector; and as the robot is caused to advance the end-effector to move the wire gripper toward the connector, in response to force feedback on the wire gripper failing to satisfy the insertion force value before reaching the maximum distance the wire gripper can advance toward the connector, determining that the wire contact is not fully inserted into the connector.

According to some embodiments, in response to determining that the wire contact is fully inserted into the connector, methods may include: causing the robot to retract the end-effector to move the wire gripper away from the connector; and in response to the wire gripper moving a pull distance without force feedback on the wire gripper exceeding a pull test value, identifying the wire contact as improperly inserted; in response to force feedback on the wire gripper exceeding a pull test value without the wire gripper having moved a pull distance, identifying the wire contact as properly inserted. In response to determining that the wire contact is not fully inserted into the connector, methods may include: causing the wire gripper to release a grip on the wire contact; causing the robot to retract the end-effector to move the wire gripper away from the connector; causing the wire gripper to re-grip the wire contact; and causing the robot to advance the end-effector to move the wire gripper and the wire contact toward the connector. Force feedback at the wire gripper may be established based on a force sensor between the robot and the wire gripper. Methods may optionally include: identifying, in images captured by the image capture devices, the orientation of a visible portion of the wire contact; and computing a corrective movement in a coordinate frame of the robot end effector using the orientation of the wire contact.

Embodiments provided herein may include a computer program product for aligning and inserting a wire contact into a target hole defined by a connector. The computer program product may include at least one non-transitory computer-readable storage medium having computer-executable program code instructions stored therein. The computer-executable program code instructions including program code instructions to: obtain captured images from at least two image capture devices attached to an end-effector of a robot, of a wire gripper of the end-effector; process images captured by the image capture devices to establish a corrective transformation to align the wire contact with the target hole of the connector in a connector surface; cause the robot to translate the end-effector to move the wire gripper along the corrective transformation; cause the robot to advance the end-effector until contact is made with the connector surface; identify, based on force measurements, if the wire contact is inside the target hole of the connector; cause the robot to advance the end-effector to move the wire contact toward the connector a predetermined additional amount more; and identify, based on movement of the wire contact the predetermined additional amount, if alignment is correct from the force feedback at the wire gripper.

The program code instructions to identify, based on force measurements, if the wire contact is inside the target hole of the connector, may include program code instructions to: identify that the wire contact is not aligned with the target hole of the connector in response to a force observed at the wire gripper above a predefined value; and identify that the wire contact is aligned with the target hole of the connector in response to the force observed at the wire gripper below the predefined value. The program code instructions to process images captured by the image capture devices to establish corrective transformation to align the wire contact with the target hole of the connector may include program code instructions to: identify, within the processed images, a tip of the wire contact and a direction along which the wire contact extends; and establish a corrective transformation to align the tip of the wire contact and the direction along which the wire contact extends with the target hole in an axis of a three-dimensional coordinate system of the robot end-effector from the processed images.

According to some embodiments, the computer program product may include program code instructions to: determine a maximum distance the wire gripper can advance toward the connector; cause the robot to advance the end-effector to move the wire gripper toward the connector; as the robot is caused to advance the end-effector to move the wire gripper toward the connector, in response to force feedback on the wire gripper satisfying an insertion force value, determine that the wire contact is fully inserted into the connector; and as the robot is caused to advance the end-effector to move the wire gripper toward the connector, in response to force feedback on the wire gripper failing to satisfy the insertion force value before reaching the maximum distance the wire gripper can advance toward the connector, determine that the wire contact is not fully inserted into the connector.

In response to determining that the wire contact is fully inserted into the connector, according to some embodiments, the computer program product may include program code instructions to: cause the robot to retract the end-effector to move the wire gripper away from the connector; and in response to the wire gripper moving a pull distance without force feedback on the wire gripper exceeding a pull test value, identify the wire contact as properly inserted; in response to force feedback on the wire gripper exceeding a pull test value without the wire gripper having moved a pull distance, identify the wire contact as properly inserted. In response to determining that the wire contact is not fully inserted into the connector, the computer program product may include program code instructions to: cause the wire gripper to release a grip on the wire contact; cause the robot to retract the end-effector to move the wire gripper away from the connector; cause the wire gripper to re-grip the wire contact; and cause the robot to advance the end-effector to move the wire gripper and the wire contact toward the connector.

Embodiments provided herein may include an apparatus to align and insert a wire contact into a target hole of a connector. An example apparatus may include: means for obtaining captured images, from at least two image capture devices attached to an end-effector of a robot, of a wire gripper of the end-effector; means for processing images captured by the image capture devices to establish a corrective transformation to align the wire contact with the target hole of the connector in a connector surface; means for causing the robot to translate the end-effector to move the wire gripper along the corrective transformation; means for causing the robot to advance the end-effector until contact is made with the connector surface; identify, based on force measurements, if the wire contact is inside the target hole of the connector; means for causing the robot to advance the end-effector to move the wire contact toward the connector a predetermined additional amount more; and means for identifying, based on movement of the wire contact the predetermined additional amount more, if alignment is correct from force feedback at the wire gripper.

According to some embodiments, the means for identifying, based on force measurements, if the wire contact is inside the target hole of the connector, may include: means for identifying that the wire contact is not aligned with the target hole of the connector in response to a force observed at the wire gripper above a predefined value; and means for identifying that the wire contact is aligned with the target hole of the connector in response to the force observed at the wire gripper being below the predefined value. The means for processing images captured by the image capture devices to establish corrective transformation to align the wire contact with the target hole of the connector may include: means for identifying, within the processed images, a tip of the wire contact and a direction along which the wire contact extends; and means for establishing a corrective transformation to align the tip of the wire contact and the direction along which the wire contact extends with the target hole in an axis of a three-dimensional coordinate system of the robot end-effector from the processed images.

Embodiments of an apparatus may include: means for determining a maximum distance the wire gripper can advance toward the connector; means for causing the robot to advance the end-effector to move the wire gripper toward the connector; as the robot is caused to advance the end-effector to move the wire gripper toward the connector, in response to force feedback on the wire gripper satisfying an insertion force value, means for determining that the wire contact is fully inserted into the connector; and as the robot is caused to advance the end-effector to move the wire gripper toward the connector, in response to force feedback on the wire gripper failing to satisfy the insertion force value before reaching the maximum distance the wire gripper can advance toward the connector, means for determining that the wire contact is not fully inserted into the connector.

According to some embodiments, in response to determining that the wire contact is fully inserted into the connector, an apparatus may include: means for causing the robot to retract the end-effector to move the wire gripper away from the connector; and in response to the wire gripper moving a pull distance without force feedback on the wire gripper exceeding a pull test value, means for identifying the wire contact as improperly inserted; in response to force feedback on the wire gripper exceeding a pull test value without the wire gripper having moved a pull distance, means for identifying the wire contact as properly inserted. In response to determining that the wire contact is not fully inserted into the connector, an apparatus may include: means for causing the wire gripper to release a grip on the wire contact; means for causing the robot to retract the end-effector to move the wire gripper away from the connector; means for causing the wire gripper to re-grip the wire contact; and means for causing the robot to advance the end-effector to move the wire gripper and the wire contact toward the connector. Force feedback at the wire gripper may be established based on a force sensor between the robot and the wire gripper. An example apparatus may further include: means for identifying, in images captured by the image capture devices, the orientation of a visible portion of the wire contact; and computing a corrective movement in a coordinate frame of the robot end effector using the orientation of the wire contact.

BRIEF DESCRIPTION OF THE DRAWINGS

Figure 1:
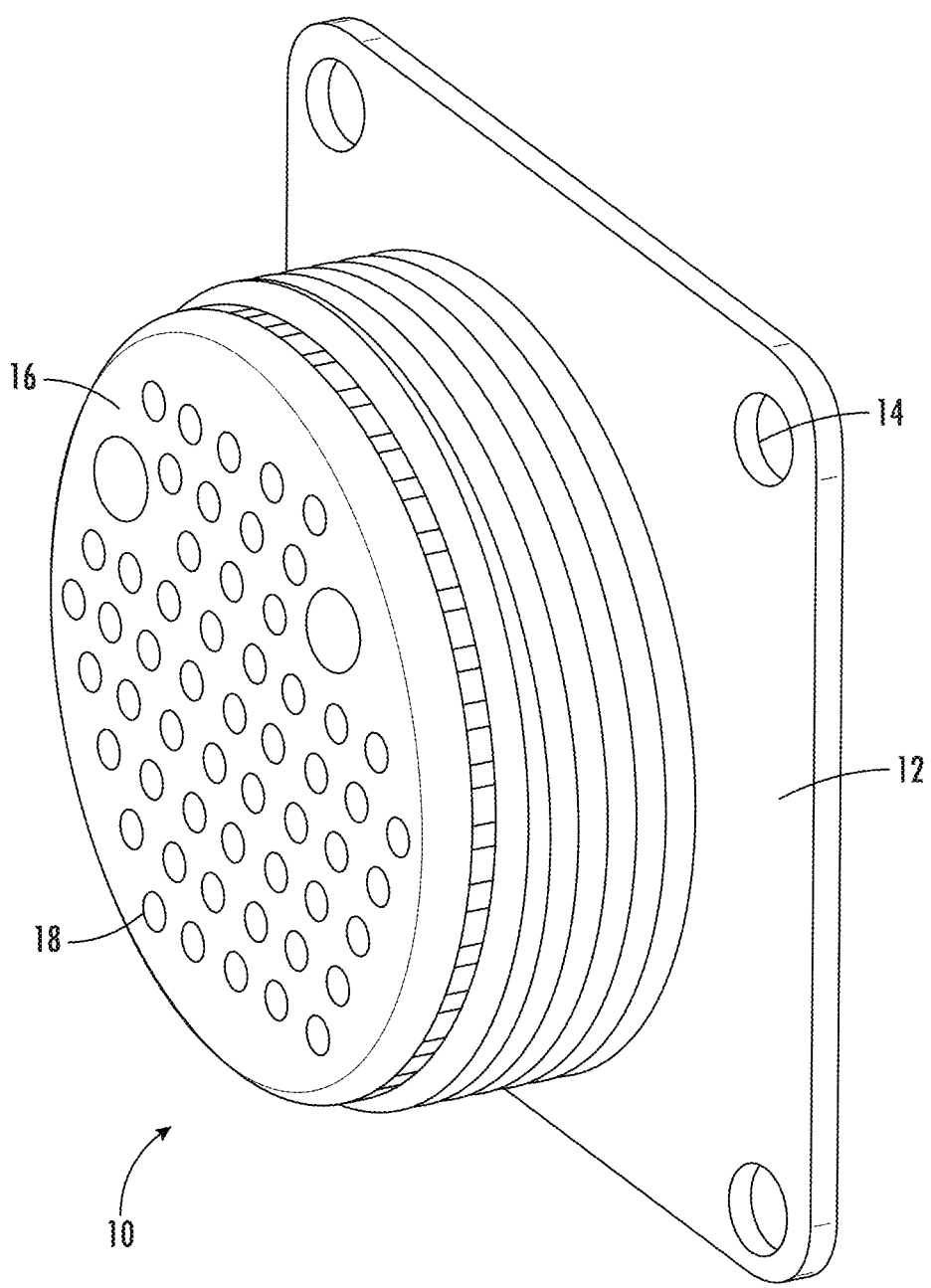
Figure 2:
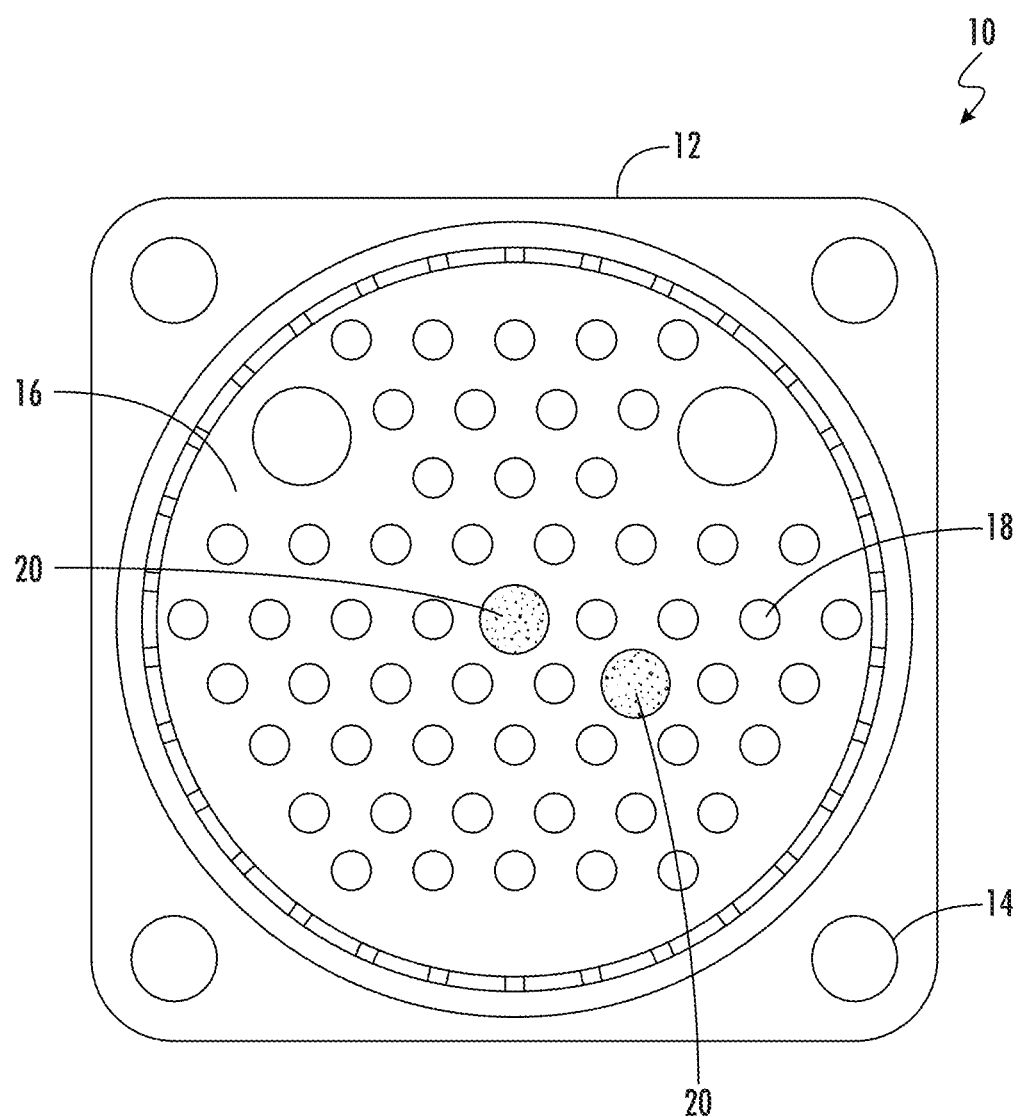
Figure 3:
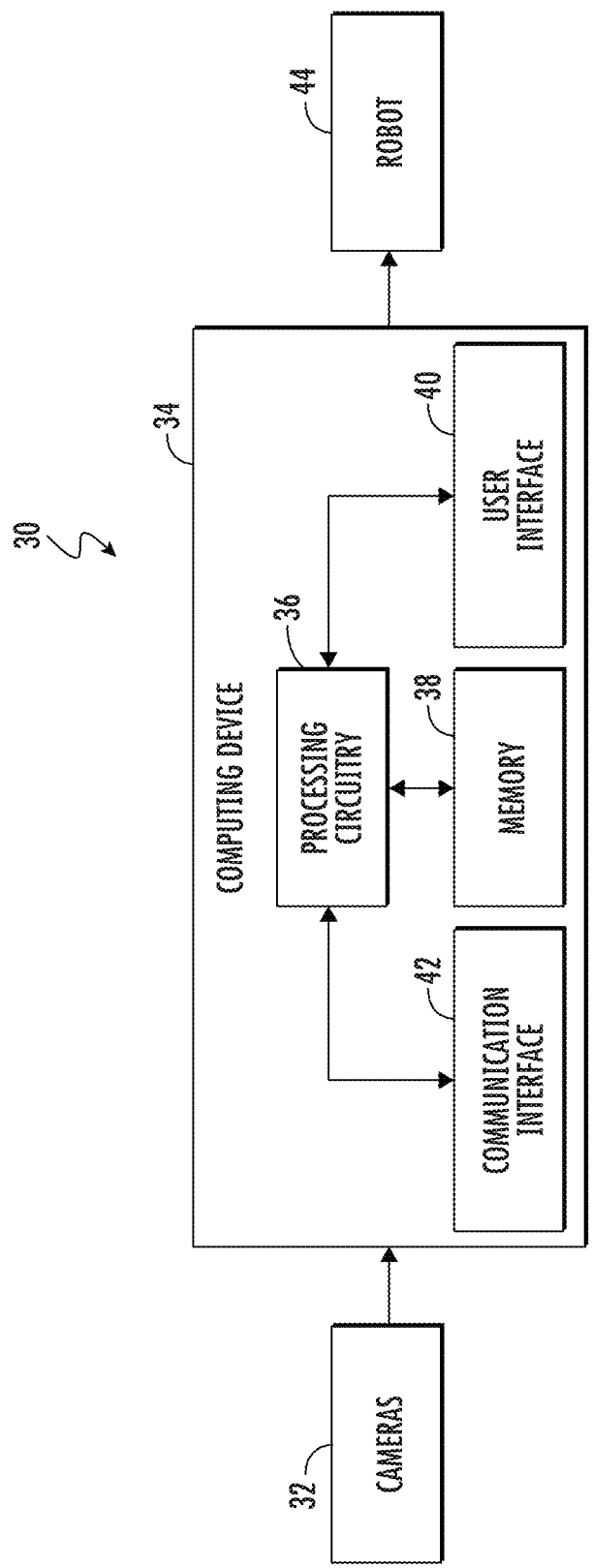
Figure 4:
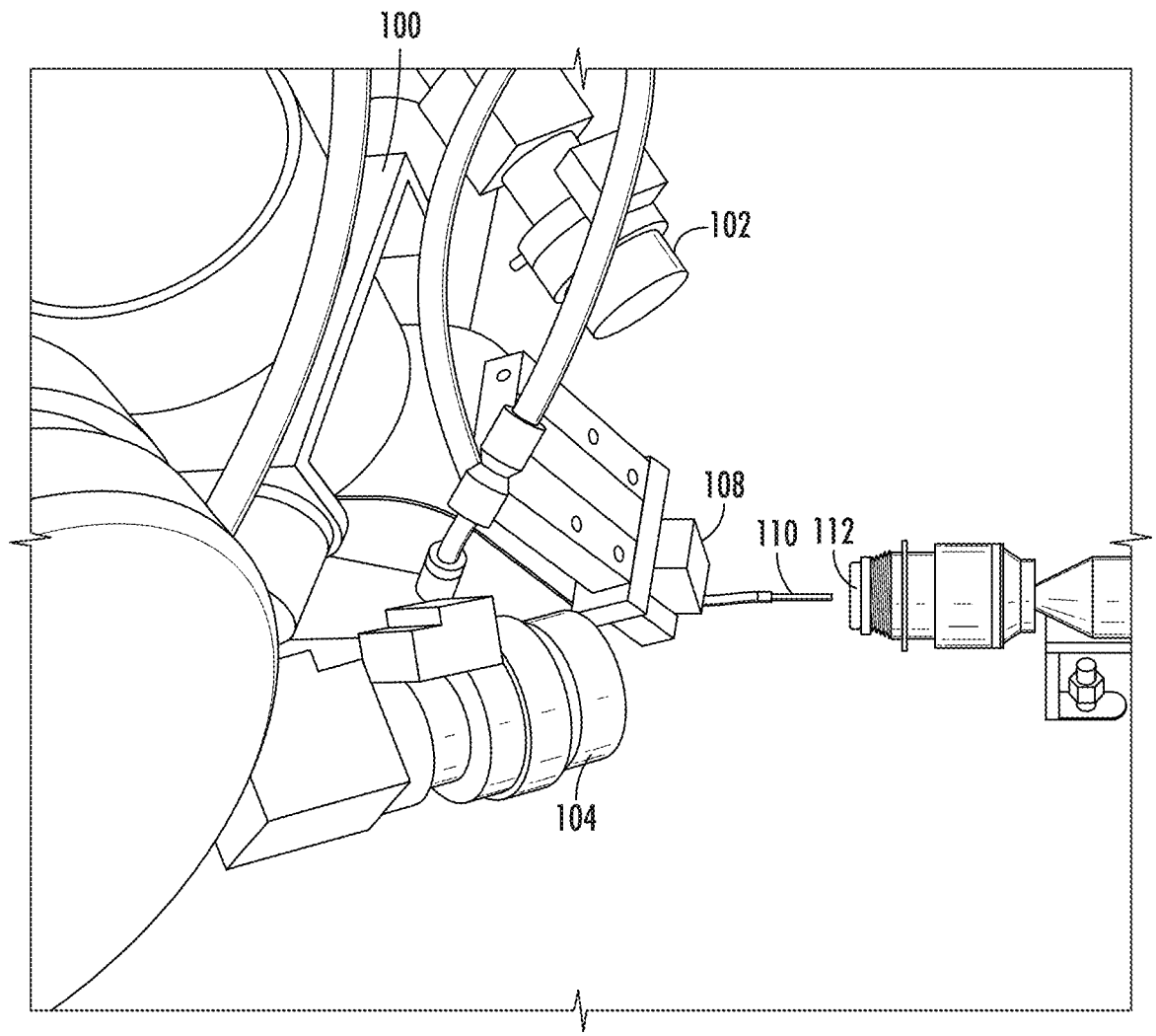
Figure 5:
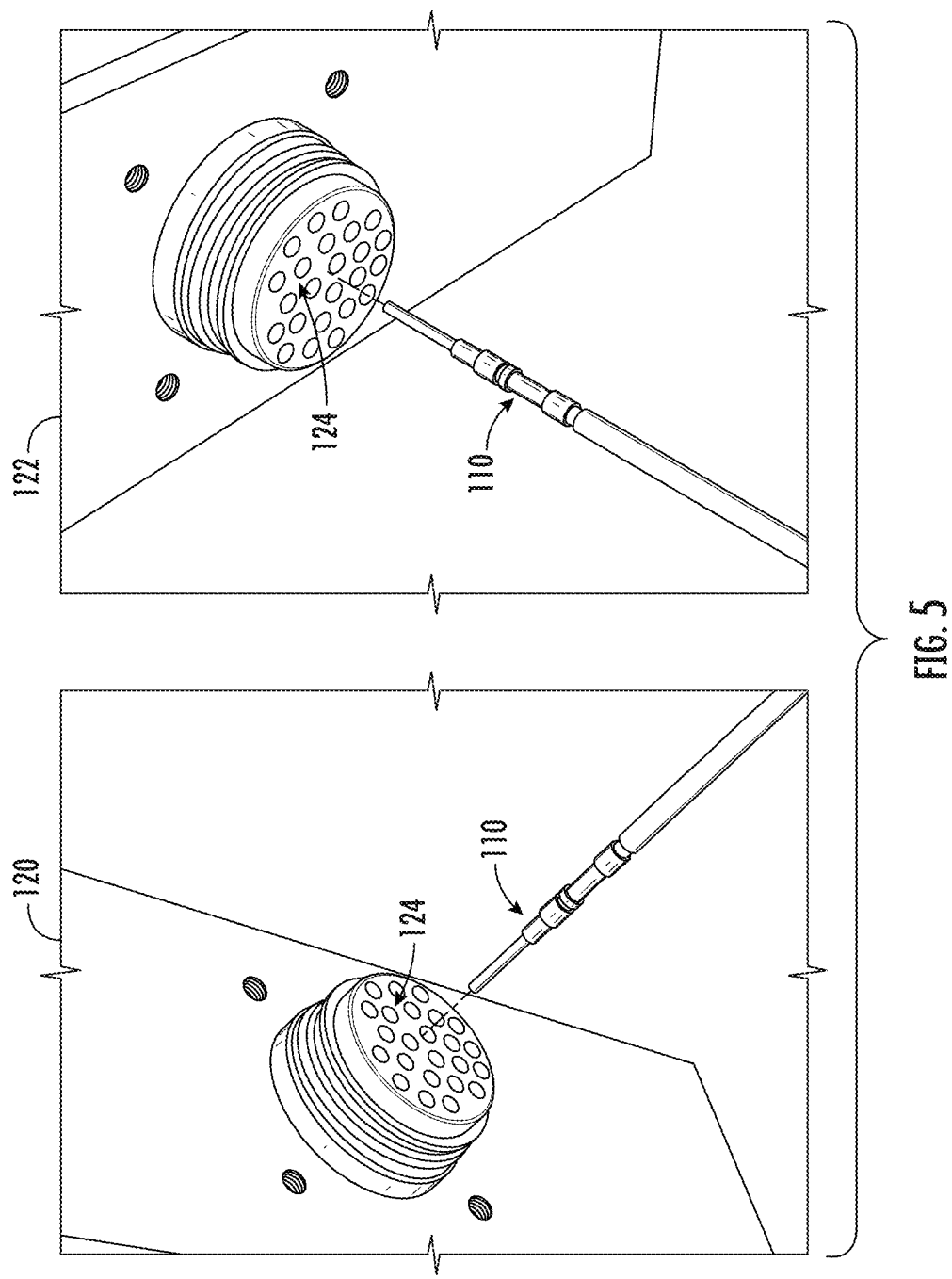
Figure 6:
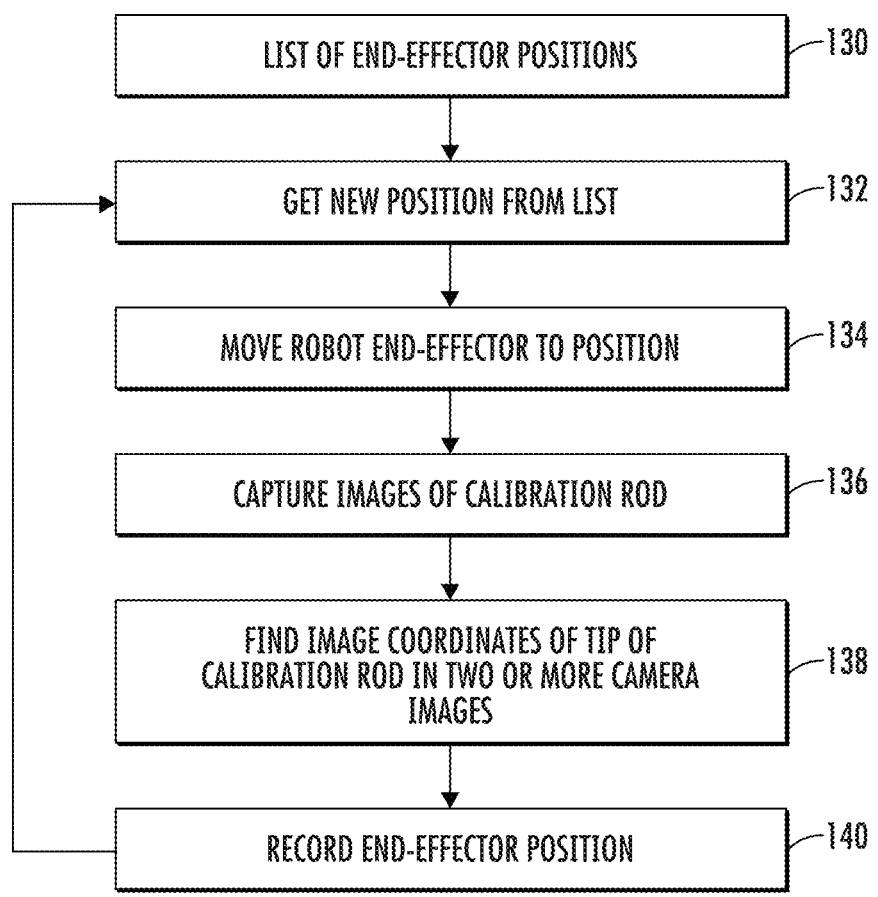
Figure 7:
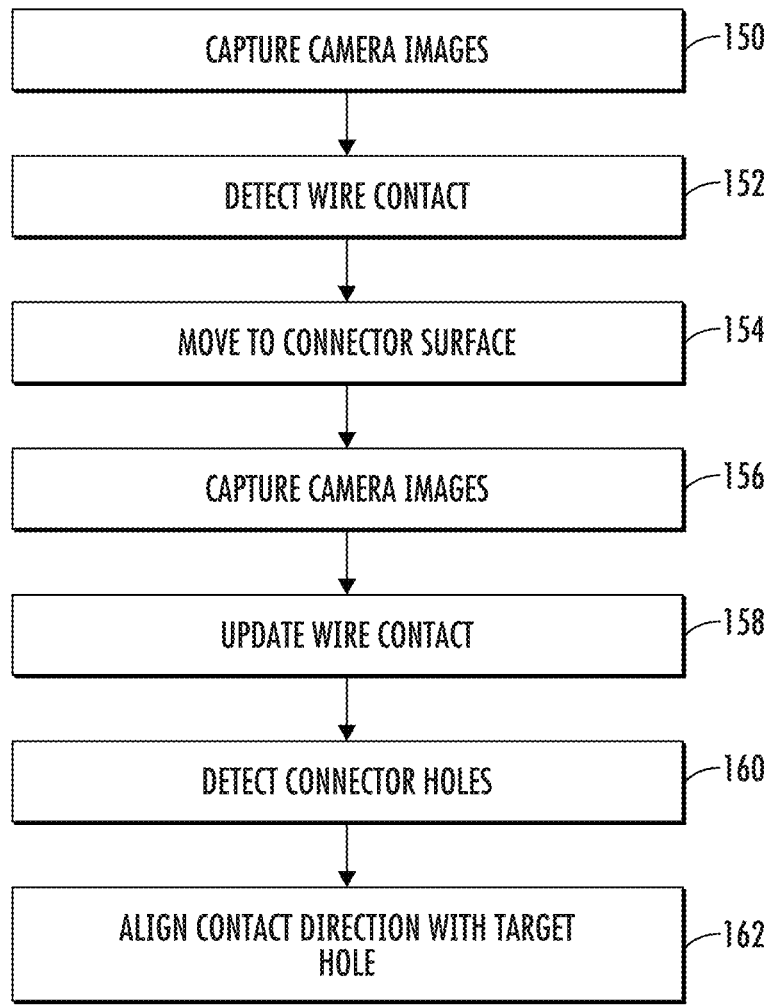
Figure 8:
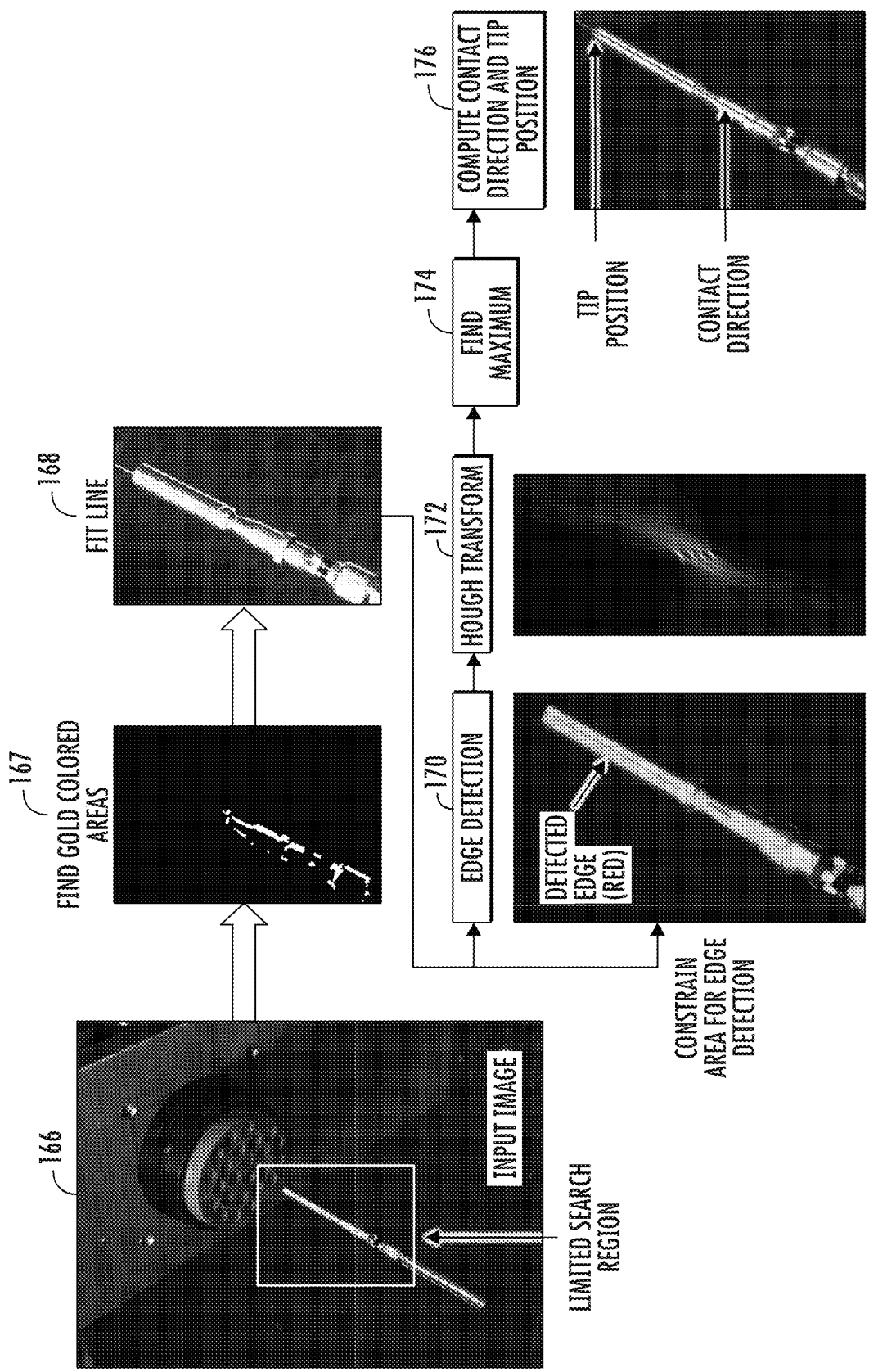
Figure 9:
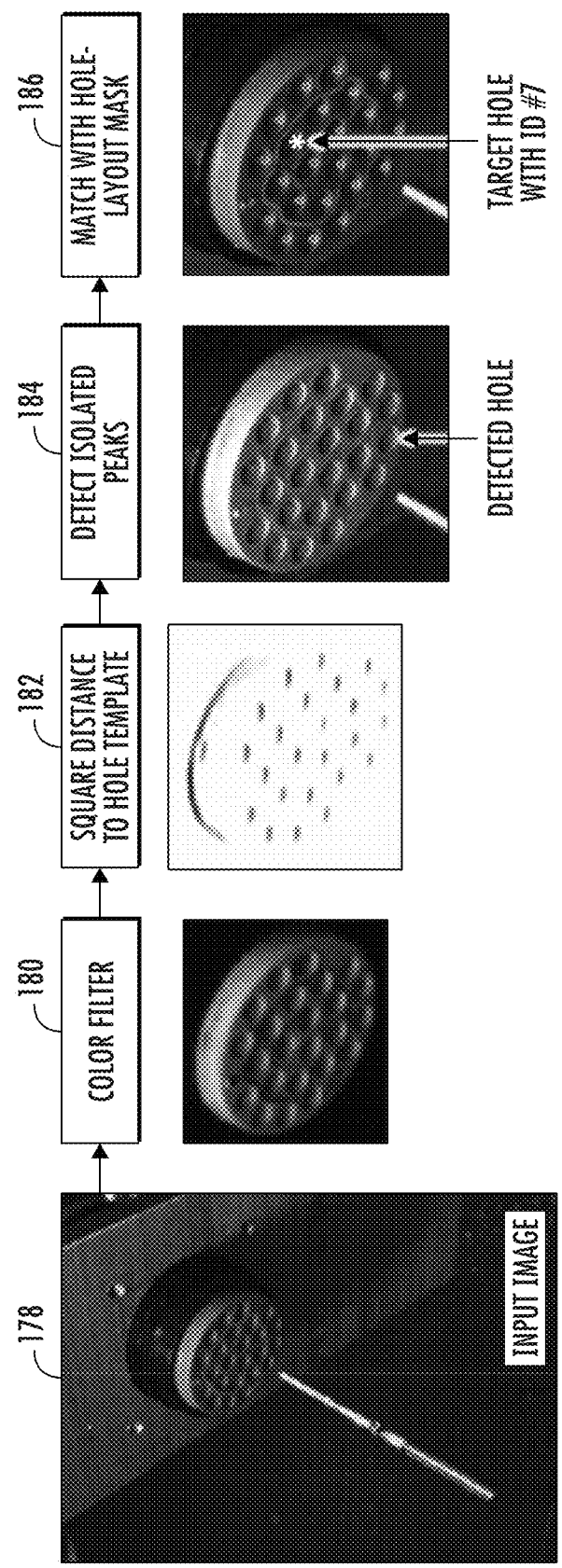
Figure 10:
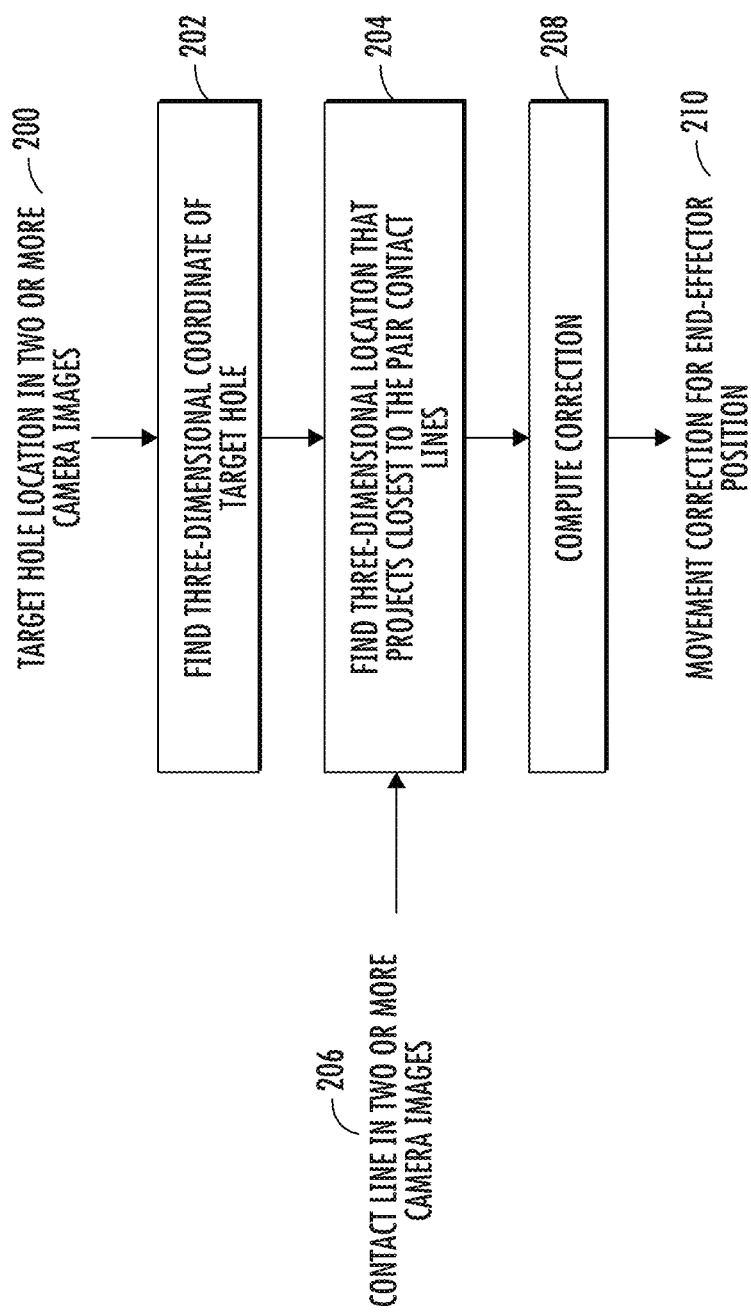
Figure 11:
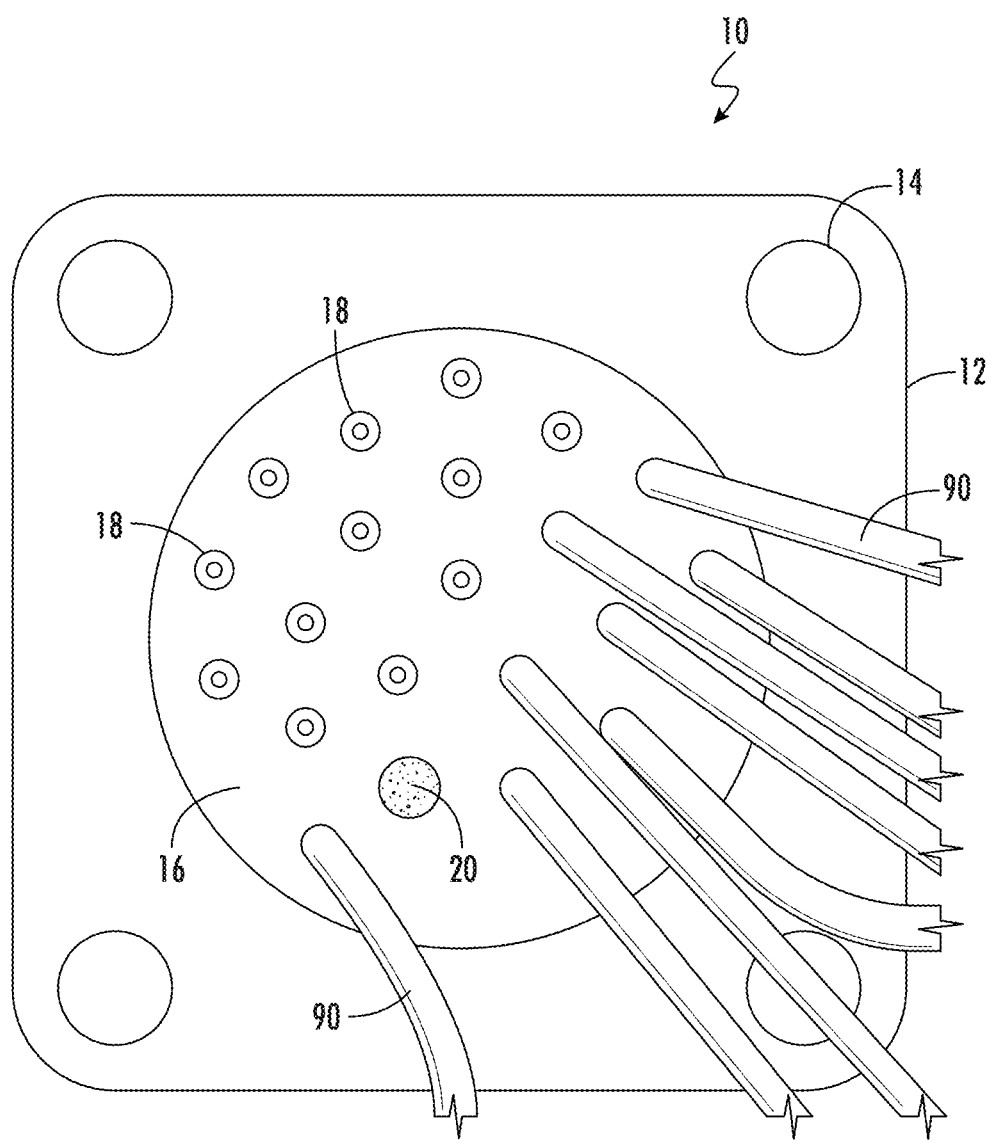
Figure 12:
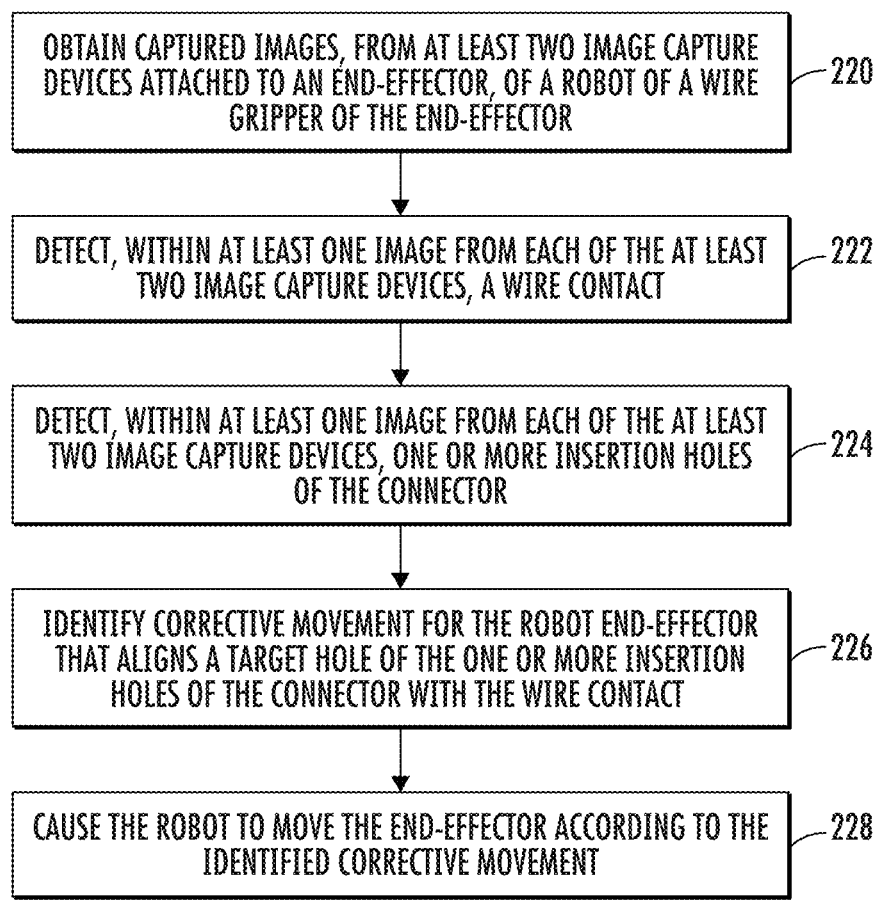
Figure 13:
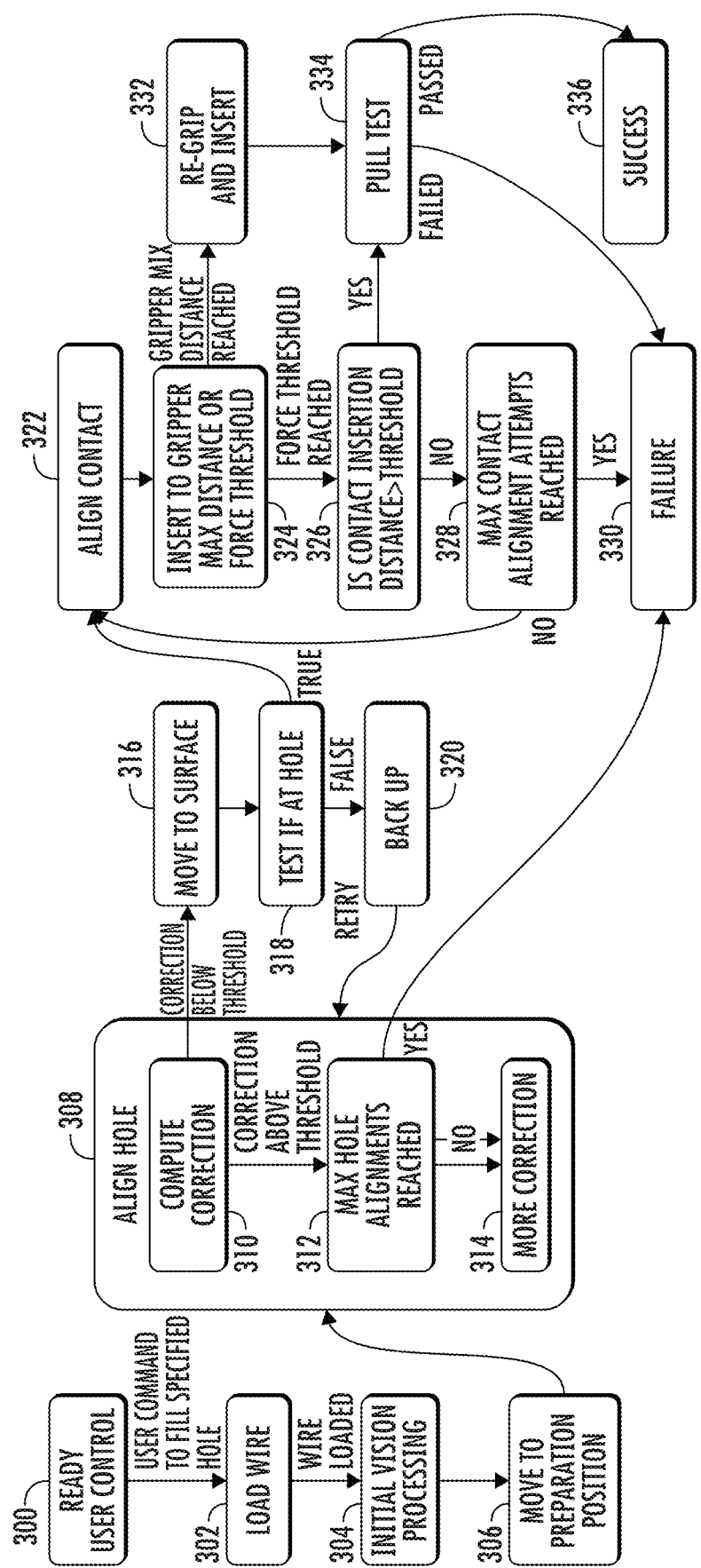
Figure 14:
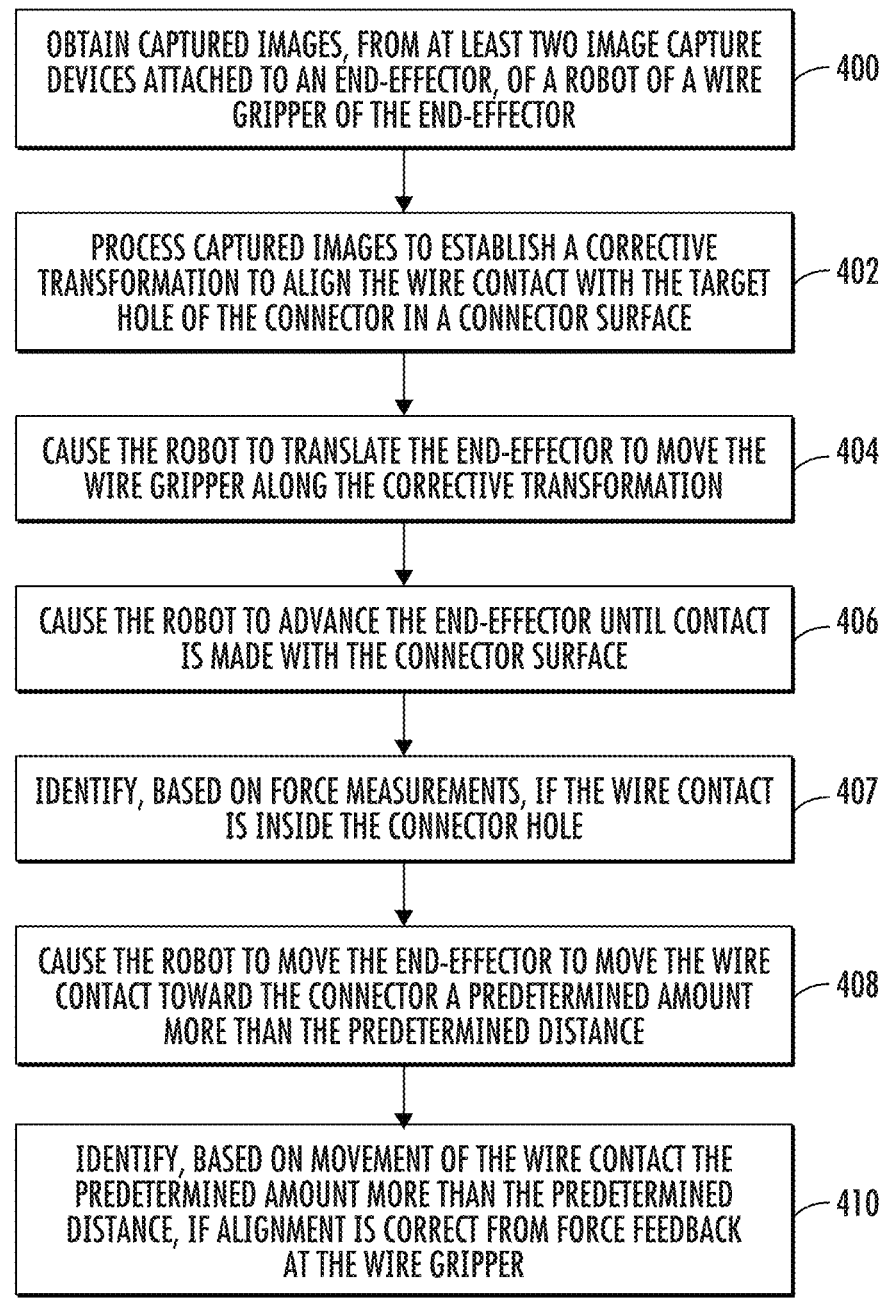

Having thus described certain example embodiments of the present disclosure in general terms, reference will hereinafter be made to the accompanying drawings which are not necessarily drawn to scale, and wherein:

FIG. 1 is a perspective view of a connector according to an example embodiment of the present disclosure;

FIG. 2 is a front view of the connector of FIG. 1 according to an example embodiment of the present disclosure;

FIG. 3 is a block diagram of the system that may be specifically configured in accordance with an example embodiment of the present disclosure;

FIG. 4 depicts a robot end-effector, wire gripper, and image capture devices according to an example embodiment of the present disclosure;

FIG. 5 illustrates images of a connector captured by the image capture devices of the robot end-effector of FIG. 4 according to an example embodiment of the present disclosure;

FIG. 6 is a flowchart of a calibration routine for calibrating the image capture devices relative to the wire gripper and robot end-effector according to an example embodiment of the present disclosure;

FIG. 7 is a flowchart of a process for aligning a wire contact with a target insertion hole according to an example embodiment of the present disclosure;

FIG. 8 illustrates the process to extract the wire contact direction and tip position from an image according to an example embodiment of the present disclosure;

FIG. 9 illustrates the process flow for detecting contact holes in connectors according to an example embodiment of the present disclosure;

FIG. 10 is a flowchart of a process for aligning the wire contact direction with a target hole of the connector according to an example embodiment of the present disclosure;

FIG. 11 illustrates a connector with a wire bundle attached thereto using example embodiments of the alignment technique described herein;

FIG. 12 is a flowchart of a process for aligning a wire contact with a target hole of a connector according to an example embodiment of the present disclosure;

FIG. 13 is a process flow of a method for aligning and inserting wire contacts with target holes of a connector according to an example embodiment of the present disclosure; and FIG. 14 is a flowchart of a process for aligning and inserting a wire contact with a target hole of a connector according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and computer program product are provided in accordance with an example embodiment described herein to align wire ends/contacts with corresponding insertion holes of a connector, such as in a rubber grommet of a connector, to facilitate automatic robotic wire insertion. The process described herein detects wire contact and insertion holes simultaneously using robotic-end-effector-mounted cameras. Using simultaneous detection, embodiments of the disclosed method provide feedback for corrective movements of a robot arm used to insert the wire contacts into the insertion holes of the connector. The movements of the robot arm align the wire contact with a target insertion hole for successful insertion into an appropriate hole of a connector. The simultaneous detection described herein includes a multi-step process to detect the contact holes which may use color filtering, computing distances to a hole template, finding extrema in a distance map, and matching a hole mask to these extrema, as described further below.

The assembly of wire bundles including the attachment of one or more wire connectors to the wire bundle has traditionally been a labor-intensive process that is both time consuming and introduces opportunities for errors in the assembly. Embodiments described herein enable the automatic assembly of wire bundles and their associated wire connectors. In particular, embodiments provide for the automatic insertion of wire ends into connectors. Embodiments described herein may use a robot arm with an end-effector to insert the wires, supporting a flexible layout of connectors and wires.

A method, system and computer program product are provided in accordance with an example embodiment in order to identify wire contacts and wire contact insertion holes defined by a connector in order to align and insert the wire contacts into the wire contact insertion holes. Although the method, system and computer program product may be configured to identify the wire contacts and wire contact insertion holes of a variety of different types of connectors, the connectors generally define a plurality of wire contact insertion holes within a housing with the wire contact insertion holes being arranged in a predefined configuration. Different connectors may include different numbers of wire contact insertion holes and may include wire contact insertion holes arranged in different configurations.

One example of a connector is depicted in FIGS. 1 and 2 in the form of a connector 10. As shown, the connector 10 includes a housing 12 and a rubber grommet 16 disposed therein. Although the housing 12 may be configured differently for other types of connectors, the housing of the connector 10 of the embodiment of FIGS. 1 and 2 is externally threaded to facilitate, for example, the secure threaded engagement of a wire bundle assembly or another connector therewith. The connector 10 of FIGS. 1 and 2 also includes a radially extending flange defining a plurality of openings 14, such as for receiving screws or other fasteners for mounting the connector to an assembly. Although the connector 10 of FIG. 1 has a cylindrical shape, the connector of other example embodiments may have different sizes and shapes. In regards to the example connector of FIGS. 1 and 2, a rubber grommet 16 is disposed within the housing and the rubber grommet defines a plurality of wire contact insertion holes 18. The wire contact insertion holes 18 defined by the rubber grommet 16 are configured, e.g., sized and shaped, such that a wire end consisting of a wire contact connected, e.g., crimped, to the end of a wire, is inserted into and mechanically retained within the wire contact insertion hole 18. In some, but not all embodiments, the rubber grommet may also include a plurality of wire contacts in alignment with respective wire contact insertion holes defined by the rubber grommet such that the wire end may be brought into secure electrical contact with a respective wire contact of the connector.

As shown by the example of the connector 10 of FIGS. 1 and 2, the plurality of wire contact insertion holes 18 defined by the rubber grommet 16, are arranged in a predefined pattern. In some embodiments, not all of the wire contact insertion holes of a connector 10 will be utilized and, instead, only a subset of the wire contact insertion holes will receive and make electrical connection with corresponding wire ends of the wire bundle assembly. As illustrated in FIG. 2, the wire contact insertion holes 18 defined by the rubber grommet 16 that are not to be utilized in conjunction with a particular application may be eliminated from further consideration by the insertion a plug 20 into the respective wire contact insertion hole defined by the rubber grommet. Although a connector 10 that may be analyzed in accordance with an example embodiment of the present disclosure is depicted in FIGS. 1 and 2 and will be described hereinafter, the method, system and computer program product of an example embodiment may be utilized in conjunction with a wide variety of other connectors and the connector is illustrated and described by way of example, but not of limitation.

Referring now to FIG. 3, a system for identifying wire contact insertion holes of a connector 10 is depicted. As shown, the system 30 includes cameras 32 configured the capture images of the connector 10. While plural cameras are indicated in FIG. 3, embodiments may employ a single camera, or may employ a single camera operating with mirrors to provide various perspectives of the connector 10 using a single camera. The cameras described herein are a type of image capture device, where a variety of image capture device types may be used in place of a camera. Image capture devices, generally, capture an image of the field of view of the device. A camera, as described herein, captures an image of the field of view in the visible light spectrum and processes the image accordingly. The cameras 32 may be configured to capture a gray scale image of the connector 10. Alternatively, the cameras 32 may be configured to capture color images of the connector 10. In an embodiment in which color images of the connector 10 are captured, the image associated with each different color channel of the cameras 32, such as the red, green and blue color channels, may be averaged to create a composite image for subsequent analysis and review. Alternatively, the different color channels of the cameras 32 may be separately analyzed. The cameras 32 are generally configured to capture images of the front face of the connector 10, such as shown in FIG. 2, such that the plurality of wire contact insertion holes 18 defined by the rubber grommet 16 are clearly visible. The cameras 32 may also be configured to capture images of the wire contacts during alignment of the wire contacts with the connector 10. As such, the image captured by the cameras 32 of an example embodiment may be captured at a plurality of angles to provide different perspectives of the connector 10 and wire contacts.

In addition to the cameras 32, the system 30 of FIG. 3 includes a computing device 34 configured to analyze the images of the connector 10 captured by the cameras and to identify wire contact insertion holes of the connector and wire contacts. As also shown in FIG. 3, the system 30 of an example embodiment also includes or is in communication with a robot 44 and, more particularly, a robotic end effector that is utilized to insert wire ends/contacts into respective candidate contact insertion holes of the connector 10 based upon the identification of the wire contact insertion holes of the connector and the wire contacts by the computing device 34.

The computing device 34 may be configured in various manners and, as such, may be embodied as a personal computer, a tablet computer, a computer workstation, a mobile computing device such as a smartphone, a server or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image captured by the camera 32 and/or an image visually depicting the closest match between the candidate contacts and a predetermined template as described below. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data, such as by receiving images from the camera 32 and transmitting information, such as a list of candidate contact insertion holes, contact ID numbers and locations of the candidate contact insertion holes in a connector-based coordinate system, to a robot 44 and/or a robotic end-effector. Although referenced herein as candidate contact insertion holes, contact ID numbers and locations of the candidate contact insertion holes, the list of candidate contact insertion holes, contact ID numbers and locations of the candidate contact insertion holes is to be interpreted so as to be associated with the candidate contact insertion holes themselves and/or wire contacts aligned with the respective candidate contact insertion holes in those embodiments that include such wire contacts. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

Referring now to FIG. 4, an example embodiment of a system performing the methods described herein is shown including a robot end-effector 100 including a first camera 102 and a second camera 104. The robotic end-effector 100 may carry a wire 110 including a wire contact at the leading end of the wire 110 in a wire gripper 108, while a connector 112 is disposed in a fixed location as it is approached by the robotic end-effector 100. The two cameras 102, 104 are mounted on the robotic end-effector 100 in such a way as to view both the wire 110 including the wire contact and the connector 112 simultaneously.

While the embodiment of FIG. 4 includes two cameras, embodiments may include more cameras. Further, a single camera may be used in conjunction with mirrors to observe different perspectives of the wire contact and the connector using the single camera. Capturing multiple perspectives, such as using two or more cameras, may enable accurate positioning of the wire contact and the connector as they are joined.

According to example embodiments described herein, images are captured of the wire and wire contact along with the connector from more than one perspective. Using the different perspectives, a line is identified that extends in the direction of the wire and wire contact and a hole in the connector that is the target hole for the wire is identified. FIG. 5 illustrates images captured by cameras 102 and 104 of FIG. 4 of the wire 110 including wire contact and the connector, specifically the identified hole 124 of the connector into which the wire 110 is to be inserted. The line, identified through multiple perspectives, provides at least a stereoscopic indication of the relationship between the wire contact and the target hole of the connector into which the wire is to be inserted. Based on the identified line from the images, a movement command may be computed that would place the hole on the line in at least two images. This may initially establish a rotation of the end-effector to bring the tip of the gripper 108 perpendicular to the connector surface. To place the hole on the line, a movement is established in parallel to the connector surface to align the line with the appropriate target hole of the connector. A movement command is the desired displacement of the robot end-effector in three-dimensional cartesian space. Aligning the wire contact with the hole places the wire in a proper position to enable the robot to move the wire along the line toward the appropriate hole of the connector for insertion.

Embodiments described herein may calibrate the cameras ahead of using them to align the wire with the target hole of the connector. The purpose of the calibration is to compute a mapping of three dimensional Cartesian coordinates onto a two dimensional image coordinates. The calibration may be carried out before wires are fed to the robotic gripper of the end-effector. Calibration is not necessary before every wire insertion or before every connector change, but may be necessary when camera settings change, such as the focus, zoom, orientation, etc.

FIG. 6 depicts a process flow of an example calibration procedure. The illustrated procedure uses a small calibration rod, which may be, for example, a small plastic rod of around an inch in length and having a distinct tip such as a red tip. According to some embodiments, the calibration rod may include a small sphere on a needle such as a computer-aided measurement machine calibration stylus or simply a small dot on a piece of paper. The calibration rod is used to provide an easily identifiable point visible in each camera field of view from the different camera perspectives. The calibration rod may be mounted firmly with the tip facing up and within reach of the robot end-effector. In preparation for calibration, the robotic end-effector is advanced to be in front of the calibration rod, such that the calibration rod's tip position mimics the expected position of a connector surface (e.g., the surface into which the connector holes are formed). The calibration procedure may begin with a list of end-effector positions, as shown at 130. One example for such a list are the three-dimensional coordinates of nodes in a 3×3×3 cubic grid, where neighboring nodes are one centimeter apart. A constraint for generating this list may be that for each coordinate of the end-effector, the tip of the calibration rod must be visible in all camera images.

A new position of the end-effector positions is obtained at 132. The robot loops through the list of end effector locations by moving the robot end-effector to the obtained position at 134, capturing images of the calibration rod at 136, finding the coordinates of the tip of the calibration rod in both camera images at 138, and recording the end effector position at 140. The process loops back to get a new position from the list until all end-effector positions have been used for calibration, or at least a predefined number of end-effector positions to provide a satisfactory calibration. In each image captured, the location of the tip of the calibration rod is identified. To identify the tip, the image may be color filtered (e.g., by computing R−(G+B)/2 for each pixel, where R, G, and B are the Red, Green, and Blue color channels, respectively). The average location of all pixels having an intensity value above a predefined value may then be computed. The predefined value may be chosen such that only the tip of the calibration rod is selected. It may be beneficial to have a light source above the calibration rod such that the tip is sufficiently illuminated and may stand out in the captured images. The result of this calibration procedure are the two-dimensional image coordinates of the tip of the calibration rod in each camera image.

Once the calibration routine of FIG. 6 is complete, the result is a list of three-dimensional end-effector positions in the end-effector coordinate frame and corresponding two-dimensional image coordinates for each camera. This set of corresponding coordinates is used by an algorithm to calibrate each camera. For example, a Perspective-n-Point (PnP) algorithm may be used to calibrate each camera. A non-limiting example of a PnP algorithm may be the UPnP+Gauss Newton algorithm. The result of this algorithm are two matrices for each camera: one that encodes the intrinsic parameters (like the focal length) and one that encodes the extrinsic parameters (position and pose of the camera). These matrices can be used to map a three-dimensional position in the robot's end-effector frame onto two-dimensional image coordinates. Using this calibration procedure, the camera locations do not need to be known in advance.

Once the cameras have been calibrated, a wire contact held by the robotic end-effector may be aligned with a connector. FIG. 7 illustrates the process of aligning a wire contact with a target insertion hole of a connector. After a wire is grasped by the robotic gripper of the end-effector, whether the wire is placed in the gripper or picked-up by the gripper, images may be captured by the cameras mounted on the end-effector at 150. In these images, the wire contact is detected and its direction obtained as shown in 152. This operation is further described below. The robot may then move the wire contact to be near the connector surface at 154. In this position, the cameras again capture images at 156 to include the wire contact and the connector. From these images, two processes are computed: first the direction of the wire contact is updated at 158; and second, connector holes are detected at 160. By combining the output of these processes, the system computes a movement command in the robot end-effector coordinates to align the contact with a target hole at 162.

After the robot executes the first alignment step, camera images are again captured and both contact and target hole positions updated. If this update yields a corrective movement command below a threshold (e.g., below 0.1 millimeters), the robot may not execute the correction and instead proceeds to move the contact toward the connector surface. The direction of the movement of the wire contact toward the connector surface matches the contact's direction in three-dimensions as obtained through the camera images. If the updated wire contact position yields a correction above the threshold, the robot may then make the corrective move and capture new images, whereby the aforementioned process is repeated until the correction is below the threshold.

The number of repetitions of the process of FIG. 7 may be limited, such as to three attempts. After this limit, the robot may abort the alignment process and indicate an error, such as through an error message of a user interface. Alternatively, the robot may start again moving the contact near the connector surface as before. Three significant elements of the alignment process of FIG. 7 are described in greater detail below.

Wire Contact Detection

The detection of the wire contact is necessary to align the contact with a target hole and to understand the movement direction for the robot end-effector once the contact is aligned. FIG. 8 depicts the process to extract the direction of a wire contact from an image. In this example embodiment, the computing device 34, such as the processing circuitry 36, may be configured to perform the various operations of extracting the direction of a wire contact and tip position from the captured images. The first operation is to extract a window of the image 166 in which the contact is expected to be. The image in the window may be color filtered (e.g., by using a single color channel) to produce an image of only the color of interest. According to an example embodiment in which the wire contacts are gold in color, the image may be color filtered to find the gold colored areas at 167. A fit line is established at 168 based on the gold colored areas extending along a linear direction. The fit line constrains the area processed for edge detection at 170, e.g., by using a 30-pixel wide corridor around the line. This corridor cuts out distracting edges in the background, e.g., from other wires. For edge detection, the Canny edge detection algorithm may be used. Non-limiting parameters of the Canny edge detector may be a sigma or two for Gaussian blurring and thresholds of 0.005 and 0.015 for edge tracing. Second, to detect lines, a Hough transform may be carried out on the edges as shown at 172. Third, using the resulting array from the Hough transform, the maximum may be found at 174 which corresponds to the longest line. By finding the maximum, the angle and orientation of the line and its distance from one of the image corners is identified. Around the maximum, nearby maxima are sought with the same line orientation. An example for these maxima is to have a value larger than 0.5 times the maximum from the Hough transform. These maxima may correspond to parallel lines in the direction of the contact. The center of the two extremal lines may be estimated as the position and orientation of the contact as shown at 176.

Once the direction of the contact is obtained, such as by the processing circuitry 36 of the computing device 34, the location of the tip of the contact is computed. To find the tip, the ends of all edge lines parallel to the contact may be determined. All ends may be projected onto the contact line. The projection that is furthest away from the image corner opposite the contact tip may be identified as the location of the tip. This process to obtain the contact direction and tip location may be repeated for at least two camera images captured from different perspectives.

In the same way as for the wire contact, though without using the gold color filter described above, the tip of the robot gripper can be obtained by the processing circuitry 36 of the computing device 34. Here, images may be analyzed without the wire contact inserted in the gripper. Such images may be captured during calibration. Since the gripper is fixed relative to the cameras, the gripper-tip location can be obtained as part of the calibration. Optionally, the gripper tip location can be computed in a process before a wire is gripped by the gripper.

Once the image coordinates of the gripper and contact tips are known in at least two camera views, the three-dimensional coordinates of the tips may be computed. To compute the three-dimensional coordinate of a point, virtual lines may be formed that extend from a camera location through the point in the image plane. These lines may be computed based on the extrinsic parameters of the cameras, as obtained during calibration. The three-dimensional coordinate may be obtained as the least-square solution that is closest to the virtual lines for at least two camera views. The direction of a contact in the three-dimensional end-effector coordinate frame may be computed as the vector difference between the contact tip three-dimensional location and the gripper tip three-dimensional location.

Contact Hole Detection

The contact hole detection is imperative to properly identify the correct hole of the connector into which the wire contact is to be inserted. In each camera image including the connector, contact holes are detected. FIG. 9 illustrates the corresponding process flow which may be performed by the processing circuitry 36 of computing device 34. At the beginning of the process, the robot end-effector is positioned in front of a connector such that the connector surface is fully visible in at least two camera images from different perspectives. For at least two of the camera images from different perspectives, the below-described process is followed.

An image is captured by a camera mounted to the robot end-effector at 178. The image may be color filtered, such as using a red color filter by computing the R−(G+B)/2 for each pixel, where R, G, and B are the values for the red, green, and blue light channels respectively. The color filter may be selected according to the color of a connector such that the filter best identifies differences in the connector surface that may correlate to holes of the connector. To crop the image, the median image coordinate of the color-filtered intensity image is computed, and a window is cut out entered on the location of the median, as shown at 180. Alternatively, the window may be centered at the tip of the wire contact. The size of the window depends upon the type of connector and may be a pre-specified parameter, such as a size of 270×270 pixels, sufficient to clearly identify each hole of the connector. The color of the filter used should correspond to the color of the connector.

The processing circuitry 36 may then be used to compute the square distance between a hole template and a local image patch from the intensity image for each patch location over the image as shown at 182. An example of a hole template may include an 18×18 pixel wide intensity gradient that mimics the shading inside a hole, where the intensity along the gradient may follow a function $f(x)=1/(1+\exp(-x/1.7))$. The intensity of the template may be scaled to match minimum and maximum values of the color-filtered intensity image. This scaling increases the robustness to changes in lighting. The result of this operation may include an intensity image in which low intensity areas (black) are areas of short distance to the hole template.

Using the intensity image may be used, such as by the processing circuitry 36 of computing device 34, to isolate extrema identified in the image. These extrema correspond to contact holes and are local minima in the distance image. To identify a local minimum, an elliptical boundary around each pixel may be analyzed. The size of the boundary may depend on the distance between neighboring holes on a connector. As a non-limiting example, the elliptical boundary may include half-axis lengths of 25 and 15 pixels, where the longer axis is in the horizontal direction approximating the elliptical shape of the holes in the camera image as the image is not coaxial with the connector. Pixels may be discarded as extrema candidates if they have one or more pixels in their boundary with an intensity below the candidate pixel's intensity times a constant factor greater than one. This constant factor may depend on the connector type. For example, the constant factor may be around 1.7. A factor larger than one ensures that the extrema are more pronounced and may eliminate or reduce false detections. For each remaining candidate pixel, a weighted average may be computed over all pixels inside its elliptical boundary, where the weight is the inverse of the intensity of each pixel in the distance image.

If a total weight computed over all pixels inside an elliptical boundary is above a threshold (e.g., 2), then the weighted average may be identified as a hole and added to the list. The detection of isolated peaks is shown at 184 whereby holes of the connector are identified. To avoid that pixels of the same hole are counted as separate holes (double counting), all pixels inside an ellipse used for weighted averaging may be marked and automatically discarded as extrema candidates. The result of this operation is a list of contact holes. As an additional operation, outliers may be removed from the hole list. To remove outliers, first the minimum distance ($d_{min}$) may be computed between two holes. Second, any hole may be discarded as an outlier that has a distance to its nearest neighbor hole that is larger than a constant factor times $d_{min}$ (e.g., the constant factor of 2).

The hole list may be matched against known hole locations from technical specifications and/or drawings of the connector. This matching can compensate for missed holes and allow for assignment of hole identification numbers to the detected holes. From the technical drawing of a connector, a two-dimensional mask of hole locations may be extracted. This mask may include a list of contacts with the identities and locations in a connector-centered coordinate system. To match the mask to the hole list, the mask may be rotated (in three axes) and translated (in three directions) in the end-effector coordinate system such that it optimally overlaps with the hole list. To compute the overlap, the mask may be projected onto each camera image using the parameters from the camera calibration. The cost function for optimization may be the sum of square distance between the holes from the list and their closest neighboring projected holes. A non-limiting example of an algorithm to optimize this cost function may include Powell's method.

Contact Alignment

The aforementioned processes provide, for each camera image analyzed, the line describing the wire contact and the location of the target hole. Based on this information, the corrective movement for the robot end-effector can be computed. The target hole location in two or more camera images is identified at 200. The three-dimensional location "p" of the target hole in the end-effector coordinate system is computed at 202. To compute this location, an optimization algorithm is used that minimizes the sum of square distances between the target hole two-dimensional image locations and the projections of the three-dimensional location on to the camera images. A non-limiting example for an optimization includes Powell's method. Here, the three-dimensional location may be constrained to lie in the plane of the connector surface. This plane may be known due to the mask-optimization process described above, which rotates and translates the mask to match the connector surface.

A location "r" is computed in the end-effector coordinate system that projects closest to the contact line in each image as shown at 204. This location may be also constrained to lie in the plane of the connector surface. An optimization algorithm may be used to compute "r". Based on the resulting values of "p" and "r", the corrective movement may be computed at 208 as c=p−r. The movement of the end-effector may be carried out at 210.

The identified target hole of the connector for the wire contact may then be utilized to facilitate insertion of wire ends into respective wire contact insertion holes of the connector. In this regard, a wire may be identified by a wiring diagram or the like to be inserted into a particular wire contact insertion hole of the connector (and, in some embodiments, also into electrical contact with a respective wire contact that is aligned with the wire contact insertion hole) with the particular wire contact insertion hole being identified by a contact ID number, which may be identified on the connector via the aforementioned map of identifiers for the connector. Prior to insertion into the wire contact insertion hole of the connector, a wire contact is generally connected to, e.g., crimped upon, a bare end of the wire to form a wire end. Based upon the contact ID numbers and corresponding locations of the candidate contact insertion hole for the connector 10, a wire end may be inserted into the connector at the location associated with a contact insertion hole having the contact ID number of the wire contact insertion hole 18 into which the wire is to be inserted. The computing device 34, such as the processing circuitry 36, may be configured to determine the candidate contact insertion hole into which a wire is to be inserted based upon the contact ID number of a candidate contact insertion hole, such as based upon correspondence between the contact ID number of a candidate contact insertion hole and the contact ID number of the wire contact insertion hole 18 into which the wire end is to be inserted as defined by a wiring diagram or the like. The computing device 34, such as the processing circuitry 36, is also configured to determine the position of a robot 44 and, more particularly, a robotic end-effector utilized to insert the wire end into the candidate contact insertion hole based upon the location of the candidate contact insertion hole in the connector-based coordinate system and using the alignment methods described above for efficient and repeatable insertion of wires into corresponding holes of the connector.

As such, the computing device 34, such as the processing circuitry 36, may effectively drive a robot 44, such as a robotic end-effector, or otherwise provide information, such as a list of candidate contact insertion holes, contact ID numbers and corresponding locations in the connector-based coordinate system, to the robot sufficient to drive the robotic end-effector in such a manner as to insert the wire ends of a wire bundle assembly into corresponding wire contact insertion holes 18. See, for example, FIG. 11 in which a plurality of wires 90 have been inserted into respective wire contact insertion holes 18 of the connector 10 in order to establish mechanical connection between the wire ends and the connector 10. By facilitating the automation of the connection process associated with a wire bundle assembly, the system 30, method and computer program product of an example embodiment increase the efficiency with which wire ends of a wire bundle assembly may be mechanically connected to a connector 10 and correspondingly reduce the error rate and cost of the resulting assembly.

While the aforementioned process involves aligning a single wire contact for insertion, embodiments of the present disclosure may be used to align and insert a plurality of wire contacts into a respective plurality of target holes of a connector. However, the order in which wire contacts are inserted into target holes may be established in such a manner as to not diminish the effectiveness of the alignment methods described herein. As discussed above, the wire contact and the target hole must each be visible in at least two camera images from two different perspectives for proper alignment. If wire contacts are inserted into the connector in an improper order, a target hole of the connector may be obstructed from view of one or more cameras. As such, an order of assembly may include starting with target holes of the connector which are furthest from the cameras, such as the bottom of the connector in the example configuration shown herein. In this manner, wires will be inserted to the connector from the bottom-up to avoid an inserted wire obstructing the camera view of a target hole. A plurality of cameras from a plurality of different perspectives may mitigate the installation order requirement as when a camera view of a target hole is obstructed, provided the target hole remains visible in at least two images from at least two perspectives, the process described herein can be performed effectively.

FIG. 12 is a flowchart of a process for aligning a wire contact with a target hole of a connector according to an example embodiment of the present disclosure. As shown, images are obtained from at least two image capture devices, such as cameras 32 of apparatus 30, attached to an end-effector of a robot, where the images are of a wire gripper of the end effector, at 220. At 222, a wire contact is detected, such as by processing circuitry 36 of computing device 34, within at least one image from each of the at least two image capture devices. Within at least one image from each of the at least two image capture devices, one or more insertion holes of the connector are detected at 224, such as by processing circuitry 36 of computing device 34. Corrective movement of the robot end effector is identified at 226, such as by processing circuitry 36 of computing device 34, that aligns a target hole of the one or more insertion holes of the connector with the wire contact. At 228, the robot (44 of apparatus 30 of FIG. 3) is caused, such as by processing circuitry 36 via communications interface 42, to move the end-effector according to the identified corrective movement.

Once the alignment of the wire contact with the target hole of the connector is performed, the wire contact may be inserted into the target hole for assembly of the connector and wire bundle thereof. Initially, a wire contact may be moved by the gripper of the end-effector of the robot to a preparation position proximate the target hole. The alignment is performed in a plane parallel to the surface of the connector, while insertion is performed on an axis orthogonal to the plane of the surface of the connector. The wire contact may be moved a predetermined distance along the insertion axis to the target hole of the connector whereby a measured force on the gripper is used to establish proper insertion of the wire contact. The wire contact may be moved the predetermined distance from the preparation position, where the predetermined distance is a distance that would result in contact with the connector in the event of misalignment, or partial insertion into the target hole in the event of proper alignment. Optionally, the robot end-effector may be advanced along the contact line until exceeding a force threshold establishing contact with a surface, either being mis-aligned and having missed a hole, or being partially inserted into a target hole. The gripper may measure the force on the gripper upon moving the predetermined distance to establish if the force is above a surface contact threshold, which may be around 0.3 to 0.5 Newtons. The process may then test to establish if the contact is inserted in the target hole by measuring forces while moving the initial predetermined distance. The process may abort if a force greater than the threshold is measured, which may be indicative of misalignment between the wire contact and the target hole. If it is determined that the wire contact was not properly aligned with the target hole, the wire contact may be moved axially away from the connector by the robot and the end-effector. The alignment process described above may be performed again to establish proper alignment and corrective transformation of the wire contact in the plane parallel to the surface of the connector.

The initial distance for the preparation position and the threshold force described above may be empirically determined and established such that the wire contact would not penetrate the rubber grommet of the connector in the event of misalignment. If the initial move from the preparation position along the insertion axis the predetermined distance is completed without exceeding the force threshold, then alignment is correct and the wire contact has successfully entered the target hole. If the robot advances a predefined distance, such as three millimeters, beyond the point where the wire contact would first touch the connector, if during this movement a force threshold (e.g., four Newtons) has not been exceeded, then it may be determined that the wire contact has successfully entered the target hole. An estimate for the target hole's position may then be calculated based on the contact's orientation vector, the initial insertion depth commanded, and an additional offset empirically determined per contact-connector pair (e.g., 0 to 8 millimeters). This additional offset may be necessary due to surface contact being detected past the connector's actual surface plane in dependence on the hole, contact geometry, and friction.

In-Hole Contact Alignment and Insertion

Once the tip of the contact has been inserted into the desired hole via the operations described above, an initial alignment correction may be performed by aligning the wire contact's orientation vector with the connector surface normal. This alignment correction may be computed by projecting the contact orientation vector onto a plane parallel to the connector surface. The purpose of this alignment correction is to correct for contacts that are bent to one side at the tip of the gripper. After alignment correction, the distance from the gripper from the connector's surface is calculated using the hole's position estimate. This distance may be used to determine the allowable distance the gripper can move without penetrating the connector past the connector's limit. Once the allowable distance is determined, the gripper may be commanded to insert the contact into the target hole by traveling the distance along the connector's surface normal/gripper orientation vector, or until an insertion force threshold is reached, such as twelve Newtons.

If the movement is executed without exceeding the force threshold, the gripper is as close to the connector as is allowable, and thus an alternative means of pushing the contact and wire forward may be needed to achieve full insertion. This may be performed through a "re-grip" operation. If the movement of the gripper is stopped due to the force threshold, then the distance that the gripper has traveled is used to determine if the wire could have been inserted. If the distance that the gripper has traveled is below a specified parameterized distance, then it may be established that the wire contact is not properly and fully inserted and seated within the connector, such that the force threshold was reached for a different reason, such as an obstruction within the connector. If the calculated distance indicates that the wire was likely inserted and seated by being past the specified parameterized distance, then a pull test may be performed to determine success or failure of the insertion process.

If the distance moved by the gripper holding the wire contact has indicated that insertion is not yet complete, then the number of insertions tried may be checked to identify any issues. If the number of insertions attempted exceeds a parameterized value, the insertion procedure may end and the insertion procedure may be considered a failure. If the number of insertion attempts is not above the parameterized value, a visual alignment operation may be performed to align the in-hole contact and the insertion process may be repeated. The visual alignment method used in an example embodiment may be the same method used to estimate the contact vector. The difference may include that the image analysis is constrained to a small image window (e.g., 100×100 pixels) near the tip of the robotic gripper, and that the length of the visible portion of the contact may be determined by intersecting the contact vector with the connector surface. The resulting vector may be used to compute a corrective movement in a coordinate frame of the robotic end-effector. The corrective movement may be computed such that it aligns the contact vector with the surface normal of the connector surface. This surface may be known due to the mask-optimization process described above.

When the gripper has advanced a wire contact as far as the gripper is permitted to move (e.g., when the gripper is as close to the connector as allowed), and the wire contact has not yet reached full insertion and seating, the gripper may perform a re-grip operation. For the re-grip and insertion operation, the gripper reduces the friction forces used to hold the wire in the gripper and moves back by a parameterized distance (e.g., 4 mm). The gripper then re-grips the wire and pushes the wire further into the connector by returning to its original position. The gripper will stop moving if it reaches its closest allowable proximity to the connector or if the insertion force threshold is reached.

Once a wire is fully inserted and seated, a pull test operation may be performed to confirm seating of the wire contact within the connector. For the pull test, the gripper may pull back on the wire, away from the connector, until a specific distance or force threshold is reached. If the force threshold is reached before the specified distance, then the wire contact is confirmed as properly seated. If the specified distance is reached before the force threshold is achieved, the wire insertion failed as the wire is determined to not be fully seated.

FIG. 13 illustrates a process flow according to the aforementioned described method of alignment and insertion of a wire contact with a target hole of a connector. As shown, the process begins at 300 with a connector mounted and ready to receive a wire contact in a target hole. The wire including the wire contact is loaded at 302 into a wire gripper (e.g., 108 of FIG. 4) of an end-effector (e.g. 100) of a robot. Initial vision processing is performed at 304, such as using cameras 102 and 104 of FIG. 4. The end-effector may then move the wire gripper and wire to the preparation position 306. At 308, alignment of the wire contact with the target hole is performed. As shown, the corrective transformation is computed at 310, using the process described in detail above. If the correction transformation is below a threshold amount, the alignment is considered complete and the process continues. If the correction transformation is above a threshold, the number of corrective transformations already completed is checked at 312, and if it is below a threshold number, the corrective transformation occurs at 314. If the number of corrective transformations exceeds a predefined number, a failure may be identified at 330. However, if the corrective transformation is successful at 314 and results in an alignment below a threshold corrective transformation, then the wire gripper holding the wire contact is moved toward the connector at 316.

The process of FIG. 13 continues at 318 whereby movement of the wire gripper toward the connector to a position in which misalignment would cause contact but not damage to the wire contact or connector. If force feedback on the wire gripper exceeds a threshold value, it may be determined that the wire contact is not aligned with the target hole, such that the wire contact is retracted at 320 and alignment is again performed at 308. If the force feedback at the wire gripper is below a threshold, the wire contact is established as being aligned with the target hole at 322. The wire gripper may then advance the wire contact to a maximum distance allowed by the wire gripper at 324. The maximum distance may be a distance at which the wire gripper does not contact the connector, or contacts the connector but does not damage the connector. In this way, the wire gripper is prevented from damaging the connector during insertion of the wire contact.

If the maximum distance of the wire gripper is reached before an insertion force threshold is observed at the wire gripper, the wire gripper may release the wire contact, while the end-effector is retracted with the wire gripper to re-grip the wire and further advance the wire contact into the target hole of the connector at 322. Once the insertion force threshold is reached, it is confirmed at 326 whether or not the wire contact was advanced at least a minimum distance into the connector. If the distance the wire contact was advanced was below a threshold distance, an obstruction within the connector may have occurred and alignment may be again attempted at 322. If the insertion distance was satisfied at 326, a pull test may be conducted. The pull test uses the wire gripper to pull the wire away from the connector. If the force at the wire gripper satisfies a pull test threshold without the wire contact moving from the connector (e.g., above a small threshold distance), then the wire contact is established as fully inserted at 334, and success is indicated at 336.

FIG. 14 is a flowchart of a method for aligning and inserting a wire contact into a target hole of a connector. The illustrated embodiment includes obtaining captured images from at least two image capture devices attached to an end-effector, the images of a wire gripper of the end-effector at 400. The captured images are processed at 402 to establish a corrective transformation to align the wire contact with the target hole of the connector. The robot translates the end-effector at 404 to move the wire griper along the corrective transformation. The robot is caused to advance the end-effector until contact is made with the connector surface at 406. Based on the force measurements at the end effector, as shown at 407, it is identified if the wire contact is inside the target hole of the connector. At 408, the robot is caused to move the end-effector toward the connector a predetermined additional amount more than the predetermined distance. Based on the movement of the wire contact the predetermined additional amount more than the predetermined distance, at 410 it is identified if alignment is correct from force feedback at the wire gripper.

As described above, FIGS. 6, 7, 10, 12, and 14 illustrate flowcharts of a system 30, method, and computer program product according to example embodiments of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system to insert wire contact into a target hole of a connector, the system comprising:
   a robot having an end-effector, wherein the end-effector comprises a wire gripper and at least two image capture devices secured to the end-effector;
   a computing device, wherein the computing device is configured to:
   process images captured by the image capture devices to establish a corrective transformation to align the wire contact with the target hole of the connector in a connector surface;
   cause the robot to translate the end-effector to move the wire gripper along the corrective transformation;
   cause the robot to advance the end-effector until contact is made with the connector surface;
   identify, based on force measurements, if the wire contact is inside the target hole of the connector;
   cause the robot to advance the end-effector to move the wire contact toward the connector a predetermined additional amount; and
   identify, based on movement of the wire contact the predetermined additional amount, if alignment is correct from force feedback at the wire gripper.

2. The system of claim 1, wherein the computing device configured to identify, based on force measurements, if the wire contact is inside the target hole of the connector, is configured to:
   identify that the wire contact is not aligned with the target hole of the connector in response to a force observed at the wire gripper above a predefined value; and
   identify that the wire contact is aligned with the target hole of the connector in response to the force observed at the wire gripper below the predefined value.

3. The system of claim 1, wherein the computing device configured to process images captured by the image capture devices to establish corrective transformation to align the wire contact with the target hole of the connector is configured to:
  identify, within the processed images, a tip of the wire contact and a direction along which the wire contact extends; and
  establish a corrective transformation to align the tip of the wire contact and the direction along which the wire contact extends with the target hole in an axis of a three-dimensional coordinate system of the robot end-effector from the processed images.

4. The system of claim 1, wherein the computing device is further configured to:
  determine a maximum distance the wire gripper can advance toward the connector;
  cause the robot to advance the end-effector to move the wire gripper toward the connector;
  as the robot is caused to advance the end-effector to move the wire gripper toward the connector, in response to force feedback on the wire gripper satisfying an insertion force value, determine that the wire contact is fully inserted into the connector; and
  as the robot is caused to advance the end-effector to move the wire gripper toward the connector, in response to force feedback on the wire gripper failing to satisfy the insertion force value before reaching the maximum distance the wire gripper can advance toward the connector, determine that the wire contact is not fully inserted into the connector.

5. The system of claim 4, wherein in response to the computing device determining that the wire contact is fully inserted into the connector, the computing device is further configured to:
  cause the robot to retract the end-effector to move the wire gripper away from the connector; and
  in response to the wire gripper moving a pull distance without force feedback on the wire gripper exceeding a pull test value, identify the wire contact as improperly inserted;
  in response to force feedback on the wire gripper exceeding a pull test value without the wire gripper having moved a pull distance, identify the wire contact as properly inserted.

6. The system of claim 4, in response to the computing device determining that the wire contact is not fully inserted into the connector, the computing device is further configured to:
  cause the wire gripper to release a grip on the wire contact;
  cause the robot to retract the end-effector to move the wire gripper away from the connector;
  cause the wire gripper to re-grip the wire contact; and
  cause the robot to advance the end-effector to move the wire gripper and the wire contact toward the connector.

7. The system of claim 1, wherein force feedback at the wire gripper is established based on a force sensor between the robot and the wire gripper.

8. The system of claim 1, wherein the computing device is further configured to:
  identify, in images captured by the image capture devices, an orientation of a visible portion of the wire contact; and
  compute a corrective movement in a coordinate frame of the robot end-effector using the orientation of the wire contact.

9. A method to align and insert a wire contact into a target hole of a connector, the method comprising:
  obtaining captured images, from at least two image capture devices attached to an end-effector of a robot, of a wire gripper of the end-effector;
  processing images captured by the image capture devices to establish a corrective transformation to align the wire contact with the target hole of the connector in a connector surface;
  causing the robot to translate the end-effector to move the wire gripper along the corrective transformation;
  causing the robot to advance the end-effector until contact is made with the connector surface;
  identify, based on force measurements, if the wire contact is inside the target hole of the connector;
  causing the robot to advance the end-effector to move the wire contact toward the connector a predetermined additional amount more; and
  identifying, based on movement of the wire contact the predetermined additional amount more, if alignment is correct from force feedback at the wire gripper.

10. The method of claim 9, wherein identifying, based on force measurements, if the wire contact is inside the target hole of the connector, comprises:
  identifying that the wire contact is not aligned with the target hole of the connector in response to a force observed at the wire gripper above a predefined value; and
  identifying that the wire contact is aligned with the target hole of the connector in response to the force observed at the wire gripper below the predefined value.

11. The method of claim 9, wherein processing images captured by the image capture devices to establish corrective transformation to align the wire contact with the target hole of the connector comprises:
  identifying, within the processed images, a tip of the wire contact and a direction along which the wire contact extends; and
  establishing a corrective transformation to align the tip of the wire contact and the direction along which the wire contact extends with the target hole in an axis of a three-dimensional coordinate system of the robot end-effector from the processed images.

12. The method of claim 9, further comprising:
  determining a maximum distance the wire gripper can advance toward the connector;
  causing the robot to advance the end-effector to move the wire gripper toward the connector;
  as the robot is caused to advance the end-effector to move the wire gripper toward the connector, in response to force feedback on the wire gripper satisfying an insertion force value, determining that the wire contact is fully inserted into the connector; and
  as the robot is caused to advance the end-effector to move the wire gripper toward the connector, in response to force feedback on the wire gripper failing to satisfy the insertion force value before reaching the maximum distance the wire gripper can advance toward the connector, determining that the wire contact is not fully inserted into the connector.

13. The method of claim 12, wherein in response to determining that the wire contact is fully inserted into the connector, the method further comprising:
  causing the robot to retract the end-effector to move the wire gripper away from the connector; and in response to the wire gripper moving a pull distance without force feedback on the wire gripper exceeding a pull test value, identifying the wire contact as improperly inserted;

in response to force feedback on the wire gripper exceeding a pull test value without the wire gripper having moved a pull distance, identifying the wire contact as properly inserted.

14. The method of claim 12, in response to determining that the wire contact is not fully inserted into the connector, the method further comprising:

causing the wire gripper to release a grip on the wire contact;

causing the robot to retract the end-effector to move the wire gripper away from the connector;

causing the wire gripper to re-grip the wire contact; and causing the robot to advance the end-effector to move the wire gripper and the wire contact toward the connector.

15. The method of claim 9, wherein force feedback at the wire gripper is established based on a force sensor between the robot and the wire gripper.

16. The method of claim 9, further comprising:

identifying, in images captured by the image capture devices, an orientation of a visible portion of the wire contact; and computing a corrective movement in a coordinate frame of the robot end effector using the orientation of the wire contact.

17. A computer program product for aligning and inserting a wire contact into a target hole defined by a connector, the computer program product comprising at least one non-transitory computer-readable storage medium having computer-executable program code instructions stored therein, the computer-executable program code instructions comprising program code instructions to:

obtain captured images from at least two image capture devices attached to an end-effector of a robot, of a wire gripper of the end-effector;

process images captured by the image capture devices to establish a corrective transformation to align the wire contact with the target hole of the connector in a connector surface;

cause the robot to translate the end-effector to move the wire gripper along the corrective transformation;

cause the robot to advance the end-effector until contact is made with the connector surface;

identify, based on force measurements, if the wire contact is inside the target hole of the connector;

cause the robot to advance the end-effector to move the wire contact toward the connector a predetermined additional amount more than; and identify, based on movement of the wire contact the predetermined additional amount more, if alignment is correct from force feedback at the wire gripper.

18. The computer program product of claim 17, wherein the program code instructions to identify, based on force measurements, if the wire contact is inside the target hole of the connector, comprises program code instructions to:

identify that the wire contact is not aligned with the target hole of the connector in response to a force observed at the wire gripper above a predefined value; and identify that the wire contact is aligned with the target hole of the connector in response to the force observed at the wire gripper below the predefined value.

19. The computer program product of claim 17, wherein the program code instructions to process images captured by the image capture devices to establish corrective transformation to align the wire contact with the target hole of the connector comprises program code instructions to:

identify, within the processed images, a tip of the wire contact and a direction along which the wire contact extends; and establish a corrective transformation to align the tip of the wire contact and the direction along which the wire contact extends with the target hole in an axis of a three-dimensional coordinate system of the robot end-effector from the processed images.

20. The computer program product of claim 17, further comprising program code instructions to:

determine a maximum distance the wire gripper can advance toward the connector;

cause the robot to advance the end-effector to move the wire gripper toward the connector;

as the robot is caused to advance the end-effector to move the wire gripper toward the connector, in response to force feedback on the wire gripper satisfying an insertion force value, determine that the wire contact is fully inserted into the connector; and as the robot is caused to advance the end-effector to move the wire gripper toward the connector, in response to force feedback on the wire gripper failing to satisfy the insertion force value before reaching the maximum distance the wire gripper can advance toward the connector, determine that the wire contact is not fully inserted into the connector.

\* \* \* \* \*